US010850782B2

United States Patent
Keatley et al.

(10) Patent No.: US 10,850,782 B2
(45) Date of Patent: Dec. 1, 2020

(54) VEHICLE COUPLING LINES STORAGE AND CONTROL ARRANGEMENT

(71) Applicant: SAF-HOLLAND, Inc., Muskegon, MI (US)

(72) Inventors: Justin D. Keatley, Zeeland, MI (US); Michael H. Ginocchio, Grand Haven, MI (US); Gerald W. Hungerink, Holland, MI (US); Mark Molitor, Muskegon, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 208 days.

(21) Appl. No.: 15/897,818

(22) Filed: Feb. 15, 2018

(65) Prior Publication Data
US 2018/0170460 A1   Jun. 21, 2018

Related U.S. Application Data

(63) Continuation of application No. 15/173,073, filed on Jun. 3, 2016, now Pat. No. 10,029,747.

(60) Provisional application No. 62/175,711, filed on Jun. 15, 2015, provisional application No. 62/315,172, filed on Mar. 30, 2016.

(51) Int. Cl.
*B60D 1/64* (2006.01)
*B62D 53/08* (2006.01)

(52) U.S. Cl.
CPC ............... *B62D 53/08* (2013.01); *B60D 1/64* (2013.01)

(58) Field of Classification Search
CPC ..................................... B60D 1/62; B60D 1/64
See application file for complete search history.

(56) References Cited

U.S. PATENT DOCUMENTS

| 3,181,888 A | 5/1965 | Boylan et al. |
| 3,628,811 A | 12/1971 | Rivers |
| 3,888,513 A | 6/1975 | Pilz et al. |
| 4,092,034 A | 5/1978 | Becker |
| 4,624,472 A | 11/1986 | Stuart et al. |
| 4,943,079 A * | 7/1990 | Harbold .................. B60T 13/38 280/420 |

(Continued)

FOREIGN PATENT DOCUMENTS

| DE | 102006012800 A1 | 9/2007 |
| EP | 1998965 A1 | 12/2008 |

(Continued)

OTHER PUBLICATIONS

European Patent Office; Supplementary European Search Report; dated Aug. 28, 2019.

*Primary Examiner* — Kevin Hurley
(74) *Attorney, Agent, or Firm* — Price Heneveld LLP

(57) ABSTRACT

A vehicle component actuation arrangement includes a vehicle component movable between a first configuration and a second configuration, an actuator configured to move the vehicle component between the first configuration and the second configuration, and a pneumatic valve arrangement pneumatically coupled to a vehicle air supply line, a vehicle pneumatic source and the actuator, where the valve arrangement is configured to move the vehicle component between the first and second configurations via the actuator when an air pressure is removed from within the vehicle air supply line.

13 Claims, 14 Drawing Sheets

(56) References Cited

U.S. PATENT DOCUMENTS

| | | | |
|---|---|---|---|
| 5,069,472 A | 12/1991 | Parr et al. | |
| 5,607,221 A | 3/1997 | Justus | |
| 5,660,408 A | 8/1997 | Johnson | |
| 7,758,059 B2 | 7/2010 | Alguera Gallego et al. | |
| 7,967,319 B2 | 6/2011 | Alguera | |
| 8,505,949 B2 | 8/2013 | Temple et al. | |
| 9,027,949 B2 * | 5/2015 | Reimer | B60D 1/015 280/432 |
| 9,725,080 B1 * | 8/2017 | Wright | B60T 13/665 |
| 2008/0012695 A1 | 1/2008 | Herschell et al. | |
| 2009/0184490 A1 * | 7/2009 | Alguera | B62D 53/125 280/420 |
| 2010/0026029 A1 | 2/2010 | Easling | |
| 2011/0133430 A1 | 6/2011 | Morris | |
| 2011/0147142 A1 * | 6/2011 | Standen | B60T 7/20 188/152 |
| 2015/0102583 A1 | 4/2015 | Reimer | |
| 2018/0257616 A1 * | 9/2018 | Mentzendorff | B60T 8/00 |
| 2019/0111832 A1 * | 4/2019 | Schrag | B60Q 1/305 |

FOREIGN PATENT DOCUMENTS

| | | |
|---|---|---|
| EP | 2508056 | 10/2012 |
| GB | 2384471 | 7/2003 |
| JP | 4925320 B2 | 4/2012 |

\* cited by examiner

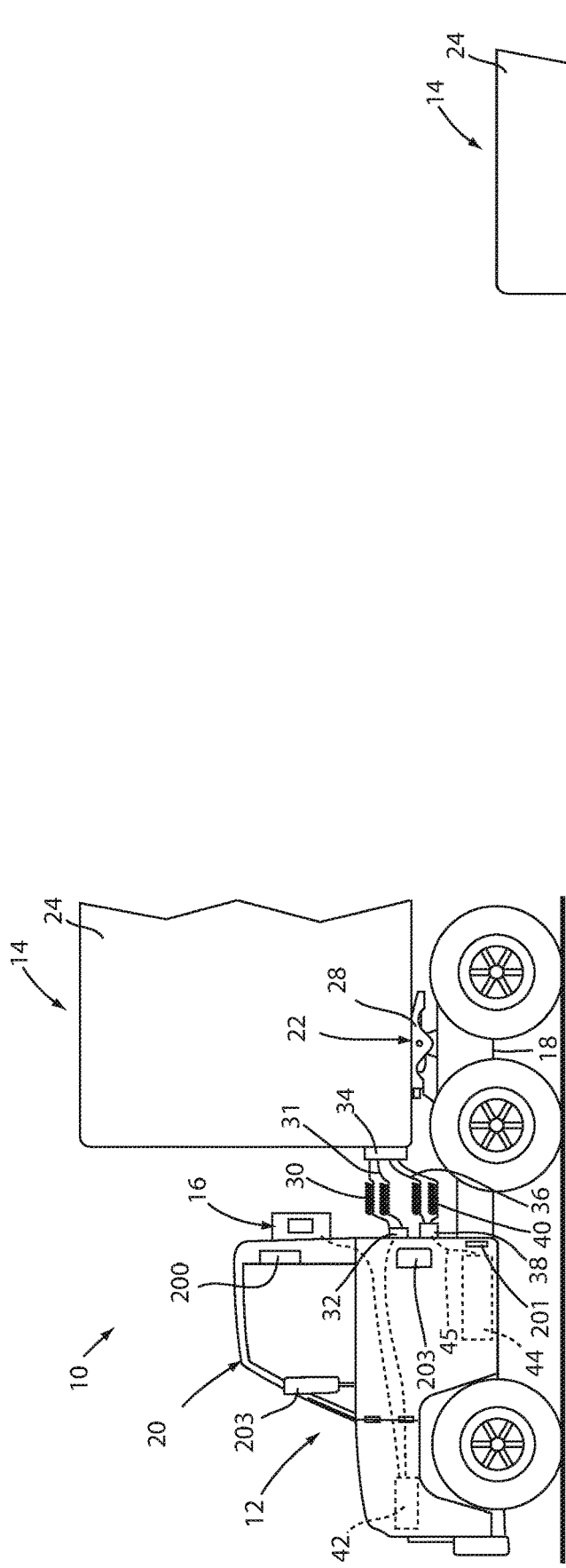
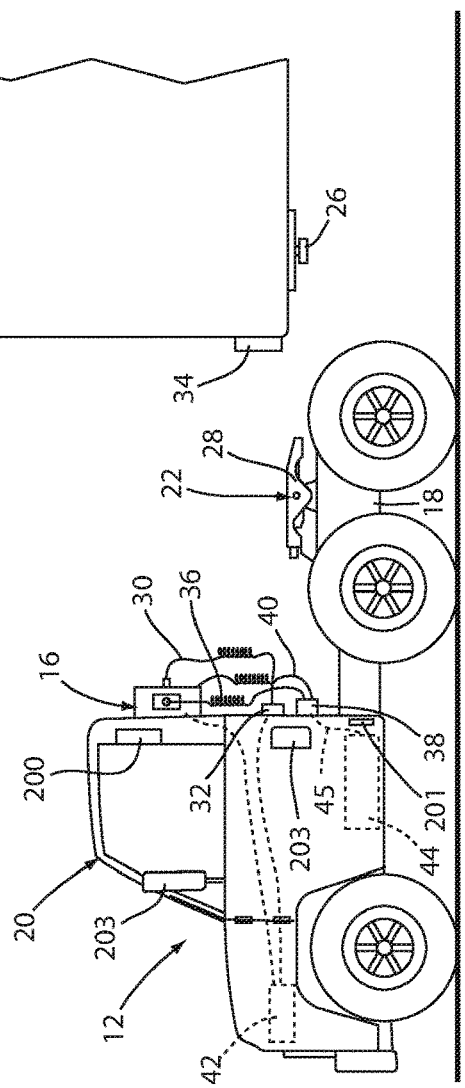
FIG. 1A
FIG. 1B

VEHICLE COUPLING LINES STORAGE AND CONTROL ARRANGEMENT

This application is a continuation of U.S. patent application Ser. No. 15/173,073, filed Jun. 3, 2016, entitled "VEHICLE COUPLING LINES STORAGE AND CONTROL ARRANGEMENT," the entire disclosure of which is incorporated herein by reference.

BACKGROUND OF THE INVENTION

Technical Field

The invention relates to a storage and control arrangement for storing electrical and pneumatic lines for connecting a tractor truck to a trailer when the lines are not in use, for communicating a coupling status of the lines and an associated fifth wheel hitch assembly, and for controlling the brakes of the associated truck and trailer as well as the coupling of the fifth wheel assembly.

BRIEF SUMMARY

In one embodiment, a vehicle component actuation arrangement includes a vehicle component movable a first configuration and a second configuration, an actuator configured to move the vehicle component between the first configuration and the second configuration, and a pneumatic valve arrangement pneumatically coupled to a vehicle air supply line, a vehicle pneumatic source and the actuator, where the valve arrangement is configured to move the vehicle component between the first and second configuration via the actuator when an air pressure is removed from within the vehicle air supply line.

In another embodiment, a vehicle component actuation arrangement includes a vehicle component movable a first configuration and a second configuration, an actuator configured to move the vehicle component between the first configuration and the second configuration, and a pneumatic valve arrangement that includes a valve member that divides a valve bore into a first chamber in pneumatic communication with a vehicle air supply line, a second chamber, a third chamber and fourth chamber in pneumatic communication with a pneumatic source, wherein the valve member is movable between a first position where the second chamber is in pneumatic communication with the pneumatic source and the first chamber is in pneumatic communicate with the actuator, and a second position where the third chamber is in pneumatic communication with the pneumatic source and the actuator, and wherein the valve member is configured to move from the first position to the second position when an air pressure is removed from within the vehicle air supply line, thereby moving the vehicle component from the first position to the second position via the actuator.

In yet another embodiment, a vehicle component actuation arrangement includes a vehicle component movable a first configuration and a second configuration, an actuator configured to move the vehicle component between the first configuration and the second configuration, and a pneumatic valve arrangement pneumatically coupled to a vehicle air supply line, a vehicle pneumatic source at a first position via a first input valve and a second position via a second input valve where the second position is spaced from the first position, and the actuator, wherein the valve arrangement is configured to move the vehicle component between the first and second configuration via the actuator when an air pressure is removed from within the vehicle air supply line, and wherein the pneumatic valve arrangement is configured to provide feedback to an operator upon malfunction of at least one of the first input valve and the second input valve and upon removal of an air pressure from within the vehicle air supply line.

In still yet embodiment, a vehicle component actuation arrangement includes a vehicle component movable a first configuration and a second configuration, an actuator configured to move the vehicle component between the first configuration and the second configuration, and a pneumatic valve arrangement. The pneumatic valve arrangement includes a first valve member that divides a first valve bore into a first chamber in pneumatic communication with a vehicle air supply line, a second chamber, a third chamber, a fourth chamber, and fifth chamber in pneumatic communication with pneumatic source, wherein the first valve member is configured to move from a first valve first position to a first valve second position, and a second valve member that divides a second valve bore into a first chamber in pneumatic communication with a vehicle air supply line, a second chamber, a third chamber, a fourth chamber, and fifth chamber in pneumatic communication with pneumatic source, wherein the second valve member is configured to move from a second valve first position to a second valve second position. The fifth chamber of the first valve bore is in pneumatic communication with the third chamber of the first valve bore, the third chamber of the first valve bore is in pneumatic communication with the third chamber of the second valve bore, and the third chamber of the second valve bore is in pneumatic communication with the actuator when the first valve member and the second valve member are in the respective second positions, and the first valve member and the second valve member move from the first position to the second position when an air pressure is removed from within the vehicle air supply line, thereby allowing air to pass from the pneumatic source to the actuator such that the actuator moves the vehicle component from the first configuration to the second configuration.

The present inventive storage and control arrangement assists in ensuring that electrical and pneumatic lines connecting a tractor truck to a trailer are not sheared or accidentally damaged while uncoupling the trailer from the truck. The storage and control arrangement also provides feedback to an operator regarding the status of the coupling of the lines to the overall unit, as well as the status of the relative arrangement of associated kingpin and fifth wheel hitch assemblies, thereby increasing operational safety and decreasing the likelihood of injury to the operator and damage to the truck and trailer, as well as making coupling and uncoupling of the kingpin from the fifth wheel assembly easier for the operator to accomplish. The system disclosed further provides for the automatic uncoupling/coupling of an associated fifth wheel hitch arrangement upon disconnect of pneumatic lines from the trailer. The system disclosed herein further increases the operational safety by providing feedback to the operator alerting the operator to potential system damage. The configuration of the storage and control arrangement allows use on new vehicle builds, as well as easy and inexpensive adaptation in retrofitting nearly any truck platform. The storage and control arrangement is efficient in use, capable of a long operating life, and is particularly well adapted for the proposed use.

These and other features, advantages, and objects of the various embodiments will be further understood and appreciated by those skilled in the art by reference to the following specification, claims, and appended drawings.

BRIEF DESCRIPTION OF THE DRAWINGS

FIG. 1A is a side elevational view of a tractor truck and trailer combination, where the trailer is coupled to the truck;

FIG. 1B is a side elevational view of the truck and trailer where the trailer is uncoupled from the truck;

DETAILED DESCRIPTION

For purposes of description herein, the terms "upper," "lower," "right," "left," "rear," "front," "vertical," "horizontal," and derivatives thereof shall relate to the various embodiments as oriented in FIG. 1A. However, it is to be understood that certain embodiments may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
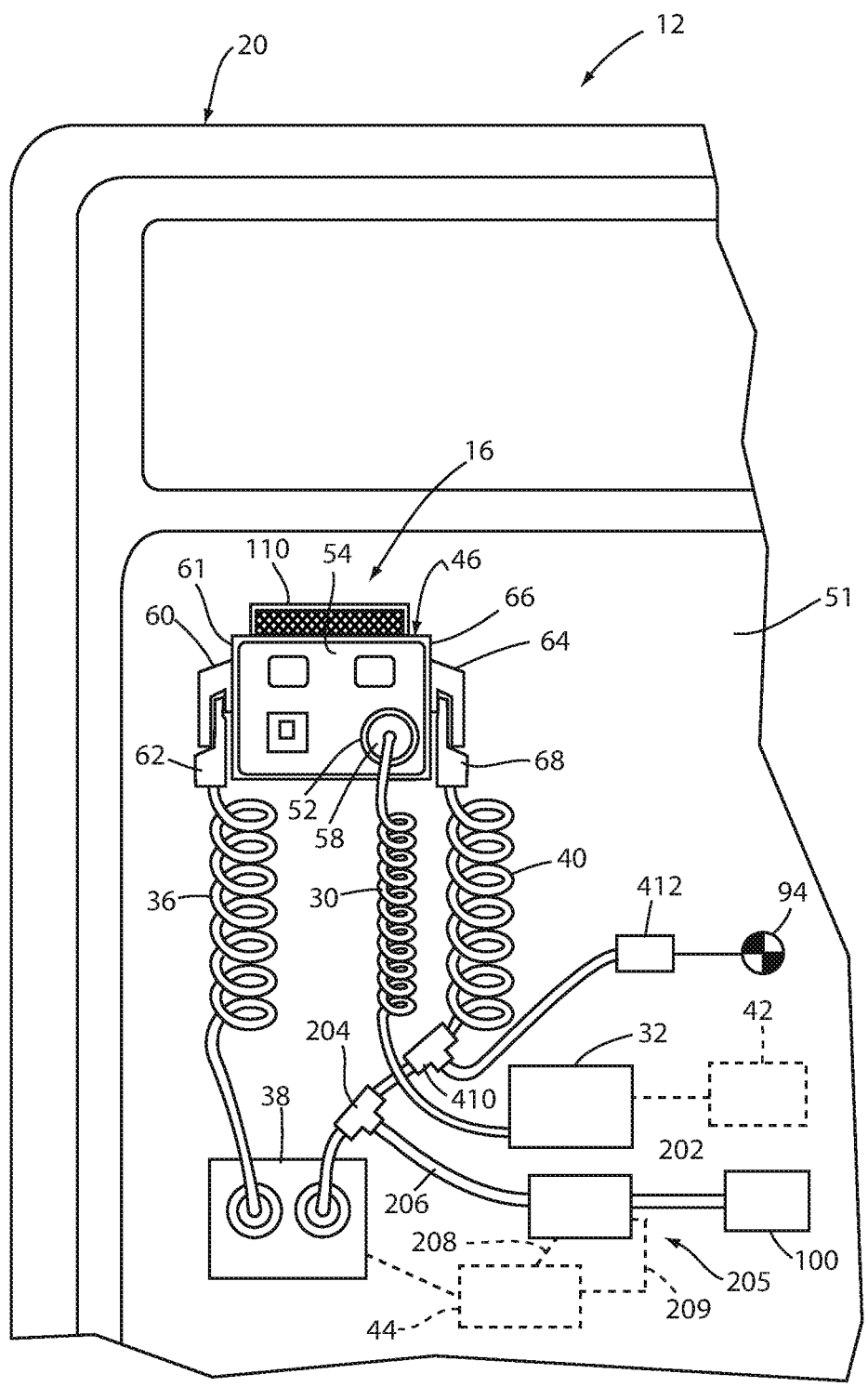
FIG. 2 is a rear elevational view of a storage and control arrangement attached to a rear panel of the truck.

A tractor truck and trailer combination 10 (FIGS. 1A and 1B) includes a tractor truck 12 and a trailer 14, wherein the tractor truck 12 includes a storage and controller arrangement 16 (FIGS. 1A, 1B and 2) embodying the present invention. In the illustrated example, the tractor truck 12 includes a frame assembly 18 supporting a cab assembly 20 and a fifth wheel hitch plate assembly 22. The trailer 14 includes a trailer body 24 and a kingpin assembly 26 extending downwardly therefrom and adapted to couple and lock with a fifth wheel hitch plate 28 of the fifth wheel hitch plate assembly 22 in a conventional manner.

The tractor truck and trailer combination 10 further includes a plurality of control and communication lines coupling the tractor truck 12 to the trailer 14. Specifically, the truck and trailer combination 10 includes an electrical line 30 extending between an electrical outlet 32 associated with the truck 12, and an electrical and pneumatic inlet arrangement 34 associated with the trailer 14. A service air line 36 carries air controlled by a foot or hand brake of the truck 12 and provides pneumatic communication between a pneumatic outlet arrangement 38 associated with the truck 12 and the electrical and pneumatic inlet arrangement 34 of the trailer 14. A supply or emergency air line 40 extends and provides pneumatic communication between the pneumatic outlet arrangement 38 of the truck 12 and the electrical and pneumatic inlet arrangement 34 of the trailer 14. Alternatively, a second electrical line 31 may extend between the truck 12 and the trailer 14, where the electrical line 30 provides power to the trailer 14 for operating items such as trailer lighting, while the second electrical line operates an electronic braking system of the trailer 14.

In the illustrated example, the electrical outlet 32 of the truck 12 is provided electrical power from an electrical source 42 of the truck 12, such as a battery, alternator, or the like. The pneumatic outlet arrangement 38 is provided with air pressure from a pneumatic source 44 of the truck 12, such as a compressor, an air tank, and the like, via an air supply line 45.

Figure 3:
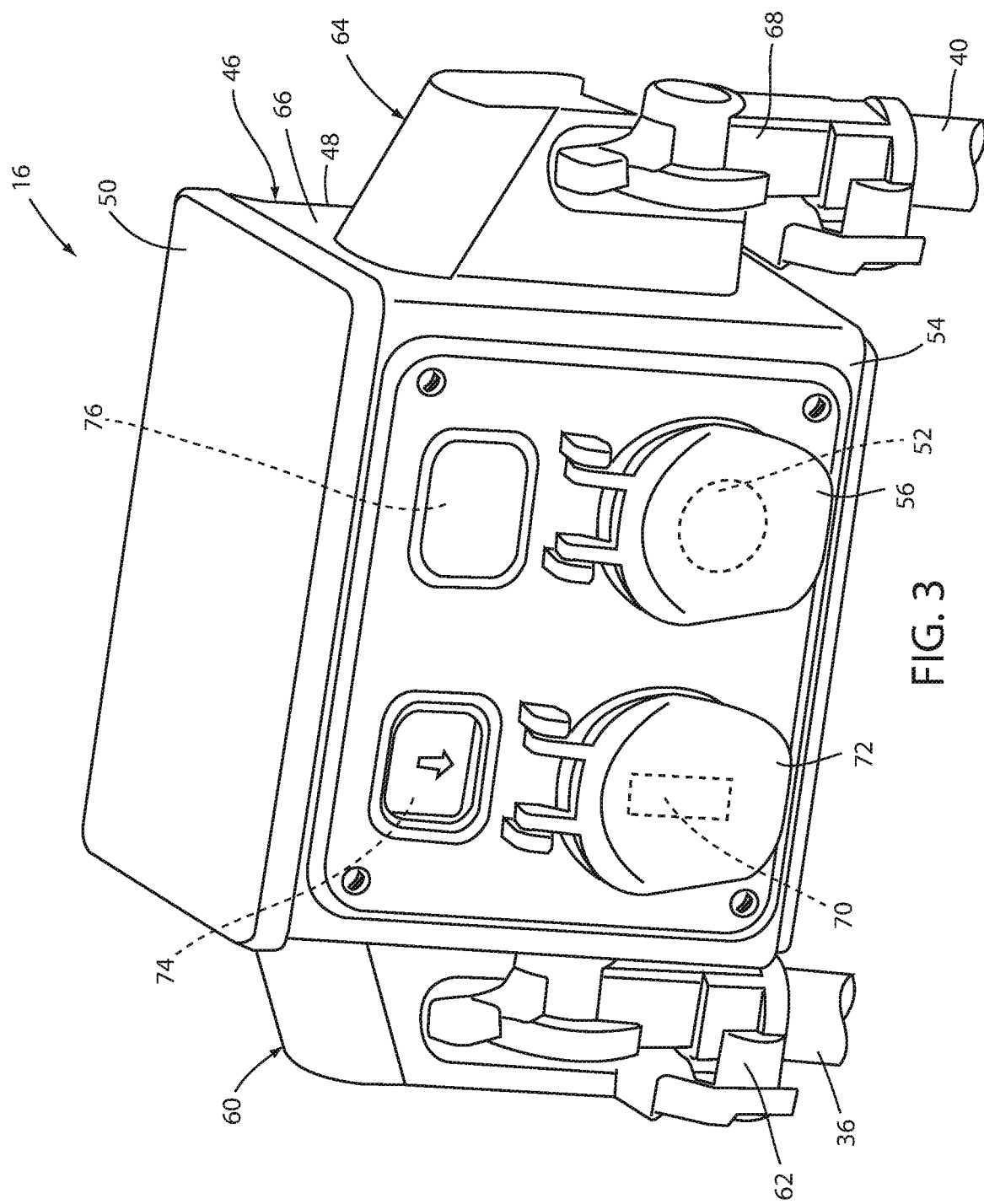
FIG. 3 is a top perspective view of the storage and control arrangement.

The storage and controller arrangement 16 (FIGS. 2 and 3) includes a housing arrangement 46 that includes a housing 48 and a top cover 50 removably coupled to the housing 48 to allow access to an interior of the housing 48. The housing arrangement 46 is connected to a rear panel 51 of the cab assembly 20 via a plurality of bolts or screws, adhesive, and the like. This arrangement allows the unit 16 to be easily connected and retrofitted to nearly any truck configuration, and further allows for easy replacement of the unit 16, should the unit 16 become irreparably damaged. The unit 16 further includes a receiver or electrical coupler or socket 52 disposed on a front face 54 of the housing 48 and covered by a movable weather or socket cover 56. The cover 56 is movable between an open position, thereby allowing coupling of an electrical plug 58 of the electrical line 30 with the electrical coupler 52, and a closed position (as illustrated in FIG. 3), where the electrical coupler 52 is protected from the elements when the plug 58 is not coupled with the electrical coupler 52.

The unit 16 further includes a receiver or glad hand coupler or hanger 60 attached to a side wall 61 of the housing 48 and adapted to releasably couple with and support a glad hand 62 of the service air line 36. Another receiver or glad hand coupler or hanger 64 is attached to another side wall 66 and is configured to releasably couple with and support a glad hand 68 of the emergency or supply air line 40.

The unit 16 may also include an actuator switch 70 disposed on the front face 54 of the housing 48 and covered by a movable weather or switch cover 72. The actuator switch 70 is adapted to control a fifth wheel locking/unlocking actuator as described below. The unit 16 may further include an indicator 74 configured to provide a visual indication to the operator as to whether the associated fifth wheel hitch plate assembly 22 and the kingpin assembly 26 are in a condition for safely uncoupling the same, and/or whether the electrical line 30, the service air line 36 and/or the supply line 40 are properly coupled to the unit 16, and a system status screen or display 76 providing the operator with a current system status, each as described further below.

Figure 4:
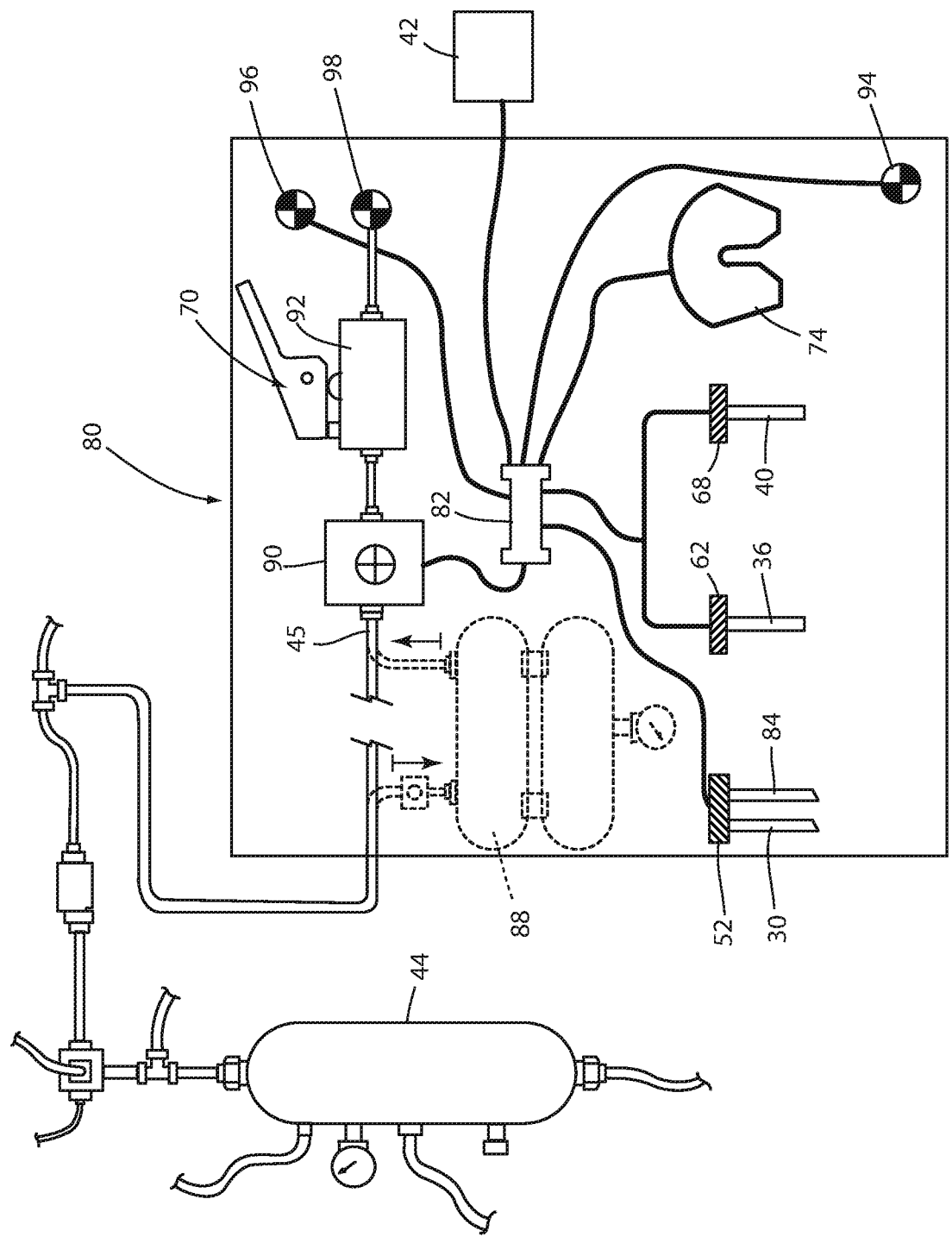
FIG. 4 is a schematic view of the storage and control arrangement.
Figure 5:
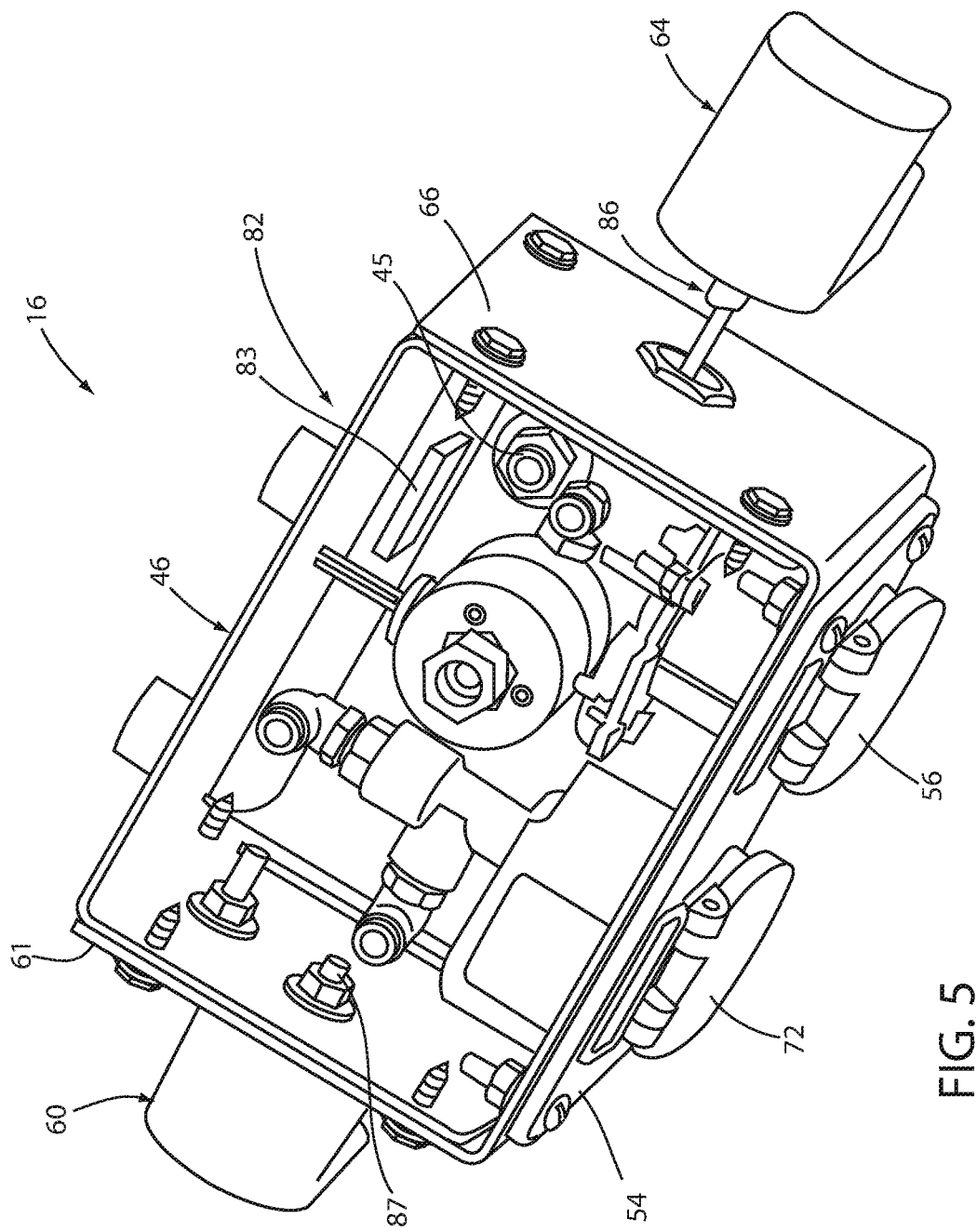
FIG. 5 is a top perspective view of the storage and control arrangement with a cover of a housing assembly removed to show internal components.

A schematic representation of the storage and controller arrangement 16 and the related truck and trailer components are illustrated in FIG. 4. In the illustrated example, a control arrangement 80 includes a logic circuit 82 operably coupled and receiving an input from the electrical line 30, the service air line 36 and the supply air line 40. The logic circuit 82 may be provided as an electrical logic circuit 83 (FIG. 5), a pneumatic logic circuit, or combinations thereof. As illustrated, the logic circuit 82 is powered by the electrical input provided by the electrical line 30. However, power may also be provided by a separate electrical line 84 extending from the electrical source 42 and operably coupled with the electrical coupler 52, or directly to the unit 16 and the logic circuit 82 from the electrical source 42 of the truck 12. The latter option would require hard wiring the unit 16 to the electrical source 42 of the truck 12.

Figure 6:
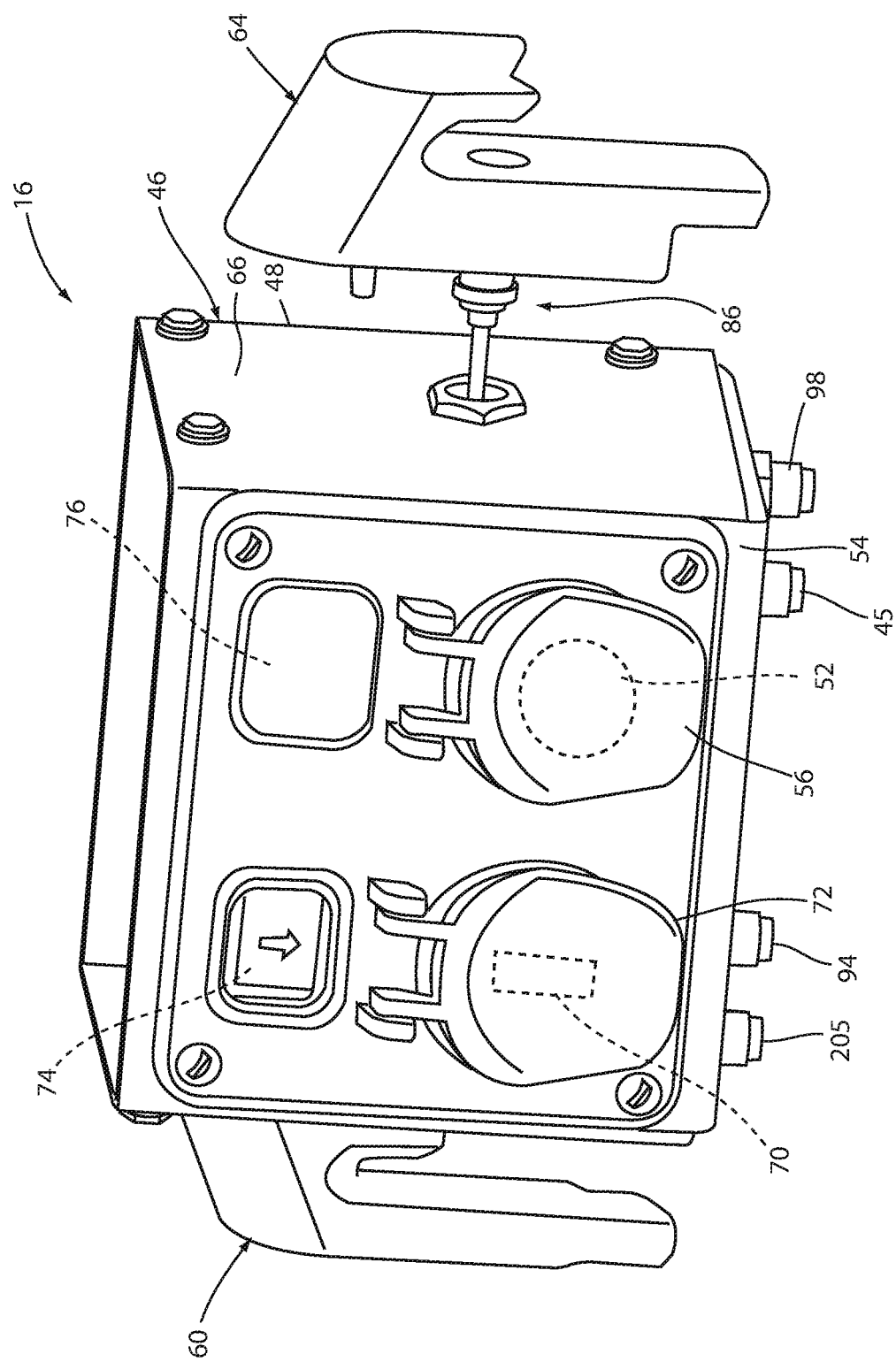
FIG. 6 is an exploded, front perspective view of the storage and control arrangement.

The unit 16 includes an optical sensor arrangement 86 (FIG. 6) positioned within the housing arrangement 46 and the glad hand coupler 64, and configured to optically sense the positioning of the glad hand 68 within the glad hand coupler 64. A similar optical sensor arrangement (not shown) is located within the housing arrangement 46 and the glad hand coupler 60 so as to sense the positioning of the glad hand 62 within the glad hand coupler 60. Alternatively, an additional optical sensor arrangement (not shown) may be utilized to sense the positioning of the plug 58 of the electrical line 30 within the electrical coupler 52. Alternative sensor arrangements may also be utilized in place of the optical sensor arrangement 86, such as contact switches, toggle switches, proximity sensors, and the like. In another alternative embodiment, the service air line 36 and/or the supply air line 40 may be pneumatically coupled and provide pneumatic input to the unit 16 when the glad hands 62, 68 are coupled with the glad hand couplers 60, 64, thereby augmenting or replacing the electrical or optical input from the optical sensor arrangements to the logic circuit 82.

In operation, pneumatic air pressure is provided to the unit 16 via the pneumatic source 44 of the truck 12. In the example illustrated in FIG. 4, the pneumatic source 44 is provided in the form of an air reservoir tank, however, other sources may also be utilized, including compressors, or secondary air reservoirs 88 associated with the storage and controller arrangement 16 or the trailer 14, thereby allowing operation of the overall system without pneumatic input from the truck 12. The air supply as supplied from the pneumatic source 44 is received by a valve arrangement 90, which is controlled by the logic circuit 82. The valve arrangement 90 prevents air pressure from travelling beyond the valve arrangement 90 until the valve arrangement 90 is opened by the logic circuit 82.

During disconnect of the trailer 14 from the truck 12, the operator of the vehicle must determine that certain components of the truck and trailer 10 are in a proper configuration so as to safely disconnect the trailer 14 from the truck 12. For example, the operator must determine that the electrical line 30, the service line 36 and the supply line 40 are properly disconnected from the electrical and pneumatic inlet arrangement 34 of the trailer 14, so that these lines are not sheared or broken as the truck 12 is driven away from the trailer 14. In order to assure that damage to the lines 30, 36, 40 does not occur, the overall system is adapted to apply the brakes of the truck, apply the brakes of the trailer, and/or prevent unlocking of the kingpin assembly 26 from the fifth wheel hitch plate assembly 22. These situations are described in greater detail in Schutt et al., U.S. Pat. No. 7,548,155, the entire disclosure of which is incorporated by reference herein. Prior to the coupling of at least one the electrical line 30, the service air line 36 and the supply air line 40 with the unit 16, the valve arrangement 90 is in a closed position. At least one of several configurations of the truck and trailer combination 10 is required when the valve arrangement 90 is in the closed condition, such as the brakes of the truck 12 may be not be disengaged, the brakes of the trailer 14 may not be disengaged, and/or the kingpin assembly 26 may not be unlocked from within the fifth wheel hitch plate assembly 22. Opening of the valve arrangement 90 allows an operator to disengage the brakes of the truck 12, disengage the brakes of the trailer 14, and/or unlock the kingpin assembly 26 from the fifth wheel hitch plate assembly 22, as described below. In the illustrated example, the electrical line 30 is engaged within the electrical coupler 52 of the unit 16, thereby providing power to the unit 16. In this configuration, power is supplied to the unit 16 by the electrical line 30 only. The logic circuit 82 can be configured to sense the supply of power from the electrical line 30, thereby automatically opening the valve arrangement 90, whereafter the overall system of the truck and trailer combination 10 may automatically disengage the brakes of the truck 12, disengage the brakes of the trailer 14, and/or unlock the kingpin assembly 26 from the fifth wheel hitch plate assembly 22. Alternatively, the unit 16 includes an operator controlled secondary valve arrangement 92 operably coupled and activated via the actuator switch 70. In this example, the logic circuit 82 opens the valve arrangement 90 thereby extending the air supply to the secondary valve arrangement 92, operated by the actuator switch 70. The operator of the vehicle can then determine whether a safe condition exists to uncouple the trailer 14 from the truck 12 by making a visual inspection of the overall system. It is noted that the actuator switch 70 may be located within the unit 16, thereby allowing the operator to decouple the kingpin assembly 26 from the fifth wheel hitch plate assembly 22 without re-entering the cab 20. Alternatively, the operator may activate the system via a remote switching device via hard wire, Wi-Fi®, BLUETOOTH®, cell phone signal, IR signals, radio signals, touch screen interface, voice activation, and the like. Alternatively, the indicator 74 of the unit 16 may provide the operator with a visual feedback indicating whether the system is in a safe condition for uncoupling. These conditions may include monitoring the coupling of the electrical line 30, the service air line 36 and/or the supply air line 40 with the unit 16, and/or the relative positioning of the kingpin assembly 26 within the fifth wheel hitch plate assembly 22. While the present example includes a logic circuit 82 being configured to determine whether the electrical line 30 is coupled with the electrical coupler 52 in order to determine whether a safe condition for uncoupling the trailer 14 from the truck 12 exists, alternative arrangements may also be employed. Specifically, the unit 16 may be configured such that the logic circuit 82 determines that a safe condition exists when any one of the three lines including the electrical line 30, the service air line 36 and the supply air line 40 are properly coupled to the unit 16, any combination of two of the lines 30, 36, 40 are properly coupled to the unit 16, or only when all three of the lines 30, 36, 40 are properly coupled to the unit 16. A similar arrangement may be configured for those systems that include a first electrical line 30, a second electrical line 31, a first air line 36 and a second air line 40. Preferably, the unit 16 and the logic circuit 82 would be configured such that the indicator 74 would not indicate to the operator that a safe condition for uncoupling the trailer 14 from the truck 12 exists unless the logic circuit 82 determines that each and every one of the lines 30, 36, 40 are properly coupled to the unit 16, thereby absolutely preventing the possibility of shearing or breaking the lines 30, 36, 40 when uncoupling the trailer 14 from the truck 12.

The unit 16 may also be utilized to assist the driver in coupling the trailer 14 with the truck 12. Specifically, the logic circuit 82 can be configured to receive an input from a fifth wheel sensor arrangement or assembly 94, such as that disclosed in Schutt et al, U.S. Pat. No. 7,548,155. The fifth wheel sensor arrangement 94 may be configured to provide an input to the logic circuit 82 regarding whether a proper alignment of the kingpin assembly 26 has been achieved with respect to the fifth wheel hitch plate assembly 22 during coupling of the trailer 14 to the truck 12. The fifth wheel sensor arrangement 94 and the unit 16 may be hard wired to one another, or may communicate via Wi-Fi®, BLUETOOTH®, and the like. The control arrangement 80 may be configured such that the valve arrangement 90 remains closed if proper alignment of the kingpin assembly 26 with the plate assembly 22 has not been achieved, thereby preventing an unsafe coupling of the trailer 14 with the truck 12. Once proper alignment of the kingpin assembly 26 with the plate assembly 22 has been sensed by the fifth wheel sensor arrangement 94, a logic circuit 82 may be configured to open the valve arrangement 90, thereby passing the air supply to the secondary valve arrangement 92 and giving the operator the ability to lock the kingpin assembly 26 with the fifth wheel hitch plate assembly 22 via the actuator switch 70.

Figure 7:
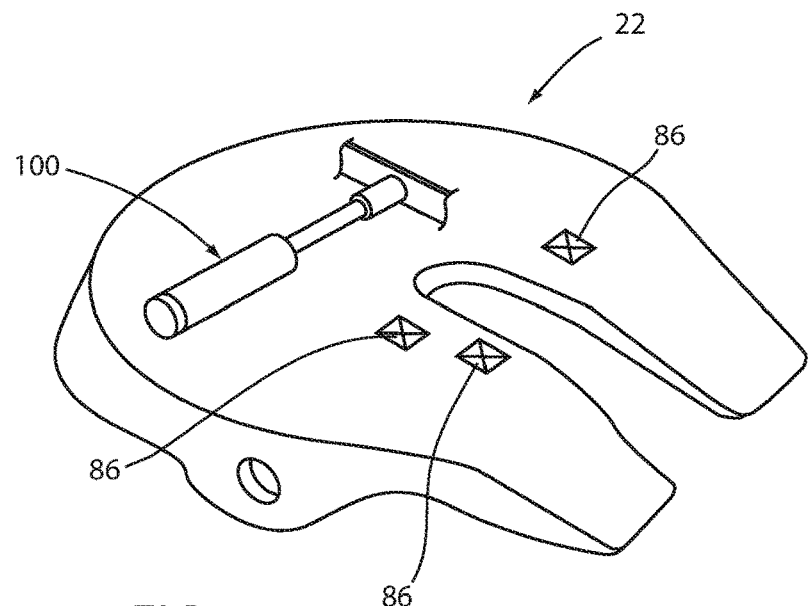
FIG. 7 is a schematic view of a fifth wheel hitch plate assembly.

As best illustrated in FIG. 4, the output of the control arrangement 80 may be an electrical output 96, a pneumatic output 98 or a combination thereof depending upon the components to be manipulated and the output desired. For example, FIG. 7 illustrates a schematic view of an automated fifth wheel coupling/decoupling arrangement 100 that is configured to unlock the kingpin assembly 26 from the fifth wheel hitch plate assembly 22. The fifth wheel coupling/decoupling arrangement 100 may be pneumatic, electric, hydraulic, or combinations thereof. As noted above, the output of the control arrangement can be configured as required to run systems and subassemblies such as the fifth wheel coupling/decoupling arrangement 100 as shown.

Figure 8:
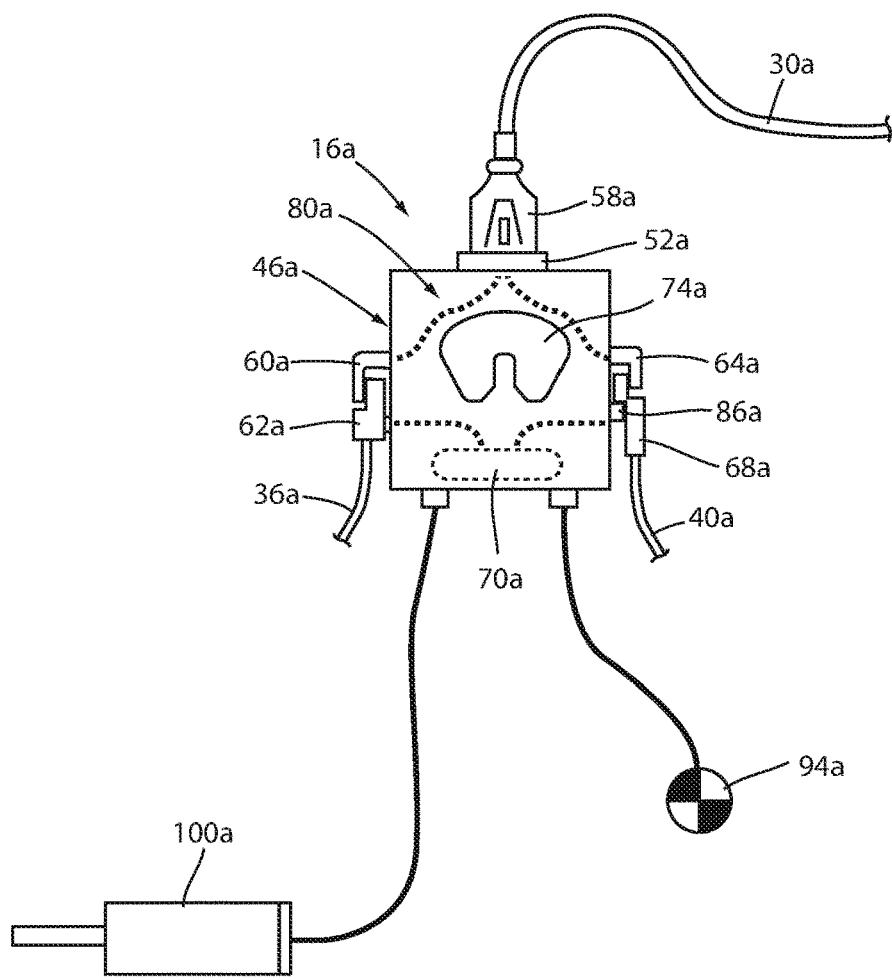
FIG. 8 is a schematic view of an alternative embodiment of the storage and control arrangement.

The reference numeral 16a (FIG. 8) generally designates another embodiment of the storage and controller arrangement 16, wherein the unit 16a is an all-electric arrangement. Since the storage and controller arrangement 16a is similar to the previously described unit 16, similar parts appearing FIGS. 2-7 and FIG. 8 respectively are represented by the same, corresponding reference numeral, except for the suffix "a" in the numerals of the latter. In the illustrated example, the unit 16a receives an electrical input from the electrical line 30a. The associated logic circuit (not shown) receives an input from the fifth wheel sensor arrangement 94a. The logic circuit may be configured to determine whether a proper arrangement between the kingpin assembly 26 and the fifth wheel hitch plate assembly 22 exists, and/or whether any or all of the lines 30a, 36a, 40a are properly coupled to the unit 16a. The control arrangement 80a may be configured to then allow the operator to couple or uncouple the kingpin assembly 26 from the fifth wheel hitch plate assembly 22 via the actuator switch 70a actuating the fifth wheel coupling/decoupling arrangement 100a.

The storage and controller arrangement 16 may also be configured to support and/or operate additional utility or indication lighting. For example, the unit 16 may also include an LED utility light arrangement 110 (FIG. 2) located so as to illuminate the area of the unit 16 associated with coupling of the lines 30, 36, 40 thereto, and/or an area about the fifth wheel hitch plate assembly 22 to allow the operator to more easily inspect the physical alignment and coupling of the kingpin assembly 26 with the fifth wheel hitch plate assembly 22. Further, indication lights may be controlled by the logic circuit 82 and provided near the fifth wheel hitch plate assembly 26 and color coded so as to communicate to the driver that a proper coupling between the kingpin assembly 26 and the fifth wheel hitch plate assembly 22 has been achieved, e.g., "red" for unsatisfactory or unsafe, and "green" for satisfactory or safe.

The system may further be configured to operate a status indicator lighting arrangement 200 (FIGS. 1A and 1B) located remotely from the unit 16. The status indicator lighting arrangement 200 is operably coupled to the unit 16 via hard wire 205 (FIG. 6), Wi-Fi®, BLUETOOTH®, and the like, and the unit 16 is coupled to the sensor assembly or arrangement 94, such that the lighting arrangement 200 provides a visual feedback to the operator indicating that a proper coupling between the kingpin assembly 26 and the fifth wheel hitch arrangement 22 has been obtained. In the illustrated example, the status indicator lighting arrangement 200 is positioned so as to be readily viewable by the operator in a rearview mirror 203, thereby allowing the operator to concentrate and visually monitor the position of the trailer 14 while simultaneously watching the status indicator lighting arrangement 200. This position of the lighting arrangement 200 also provides a convenient viewing location for the operator while manually decoupling the kingpin assembly 26 from the fifth wheel hitch plate assembly 22. For this purpose, the lighting arrangement 200 may also be positioned at other locations that are readily viewable by the operator without requiring the operation to peer beneath the trailer 14, such as the positions represented by reference numerals 201 and 203.

Figure 9:
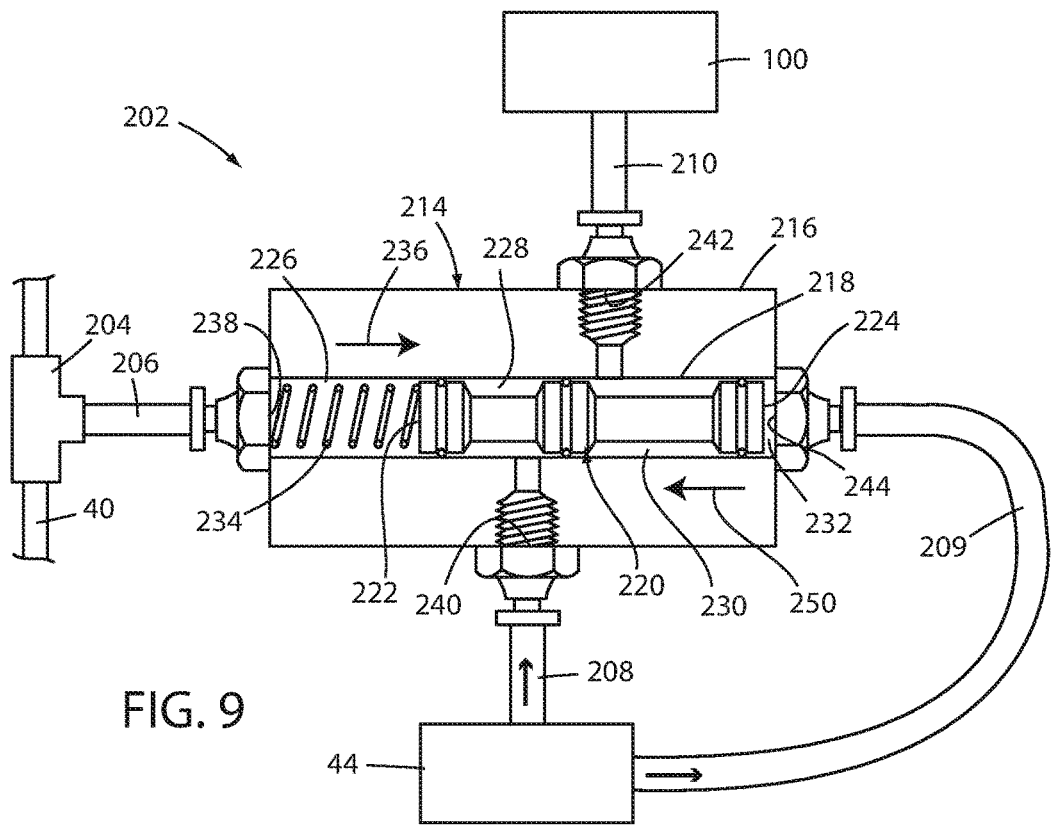
FIG. 9 is a schematic view of an automatic vehicle component actuation arrangement in a first position.

In another alternative embodiment, the storage and controller arrangement 16 (FIG. 2) further includes an automatic vehicle component actuation arrangement 205 (FIG. 9). In the illustrated example, the actuation arrangement 205 includes an activation valve arrangement 202 pneumatically coupled to the supply air line 40 via a T-fitting 204 and a valve supply air line 206, to the pneumatic source 44 via a first air line 208 and a second air line 209, and to a vehicle component such as the fifth wheel coupling/decoupling arrangement 100 via an air line 210. The automatic component actuation arrangement 205 is configured to automatically actuate a vehicle component such as the fifth wheel coupling/decoupling arrangement 100 when the glad hand 68 associated with the supply air line 40 is uncoupled from the electrical and pneumatic inlet arrangement 34 associated with the trailer 14.

In the illustrated example, the valve arrangement 202 includes a valve assembly 214 that includes a valve housing 216 having a valve bore 218, and a valve member 220 slidably received within the valve bore 218. The valve member 220 includes a first end 222 and a second end 224 and is configured to define a first chamber 226, a second chamber 228, a third chamber 230, and a fourth chamber 232 within the valve bore 218. A spring member 234 biases the valve member 220 in a direction 236. As illustrated, the valve housing 216 includes a first port 238 in pneumatic communication with the first chamber 226 and the supply air line 40 via the air line 206, a second port 240 in pneumatic communication with the second chamber 228 and the pneumatic source 44 via the first air line 208, a third port 242 in pneumatic communication with the third chamber 230 and the fifth wheel coupling/decoupling arrangement 100 via the air line 210, and a fourth port 244 in pneumatic communication with the fourth chamber 232 and the pneumatic source 44.

Figure 10:
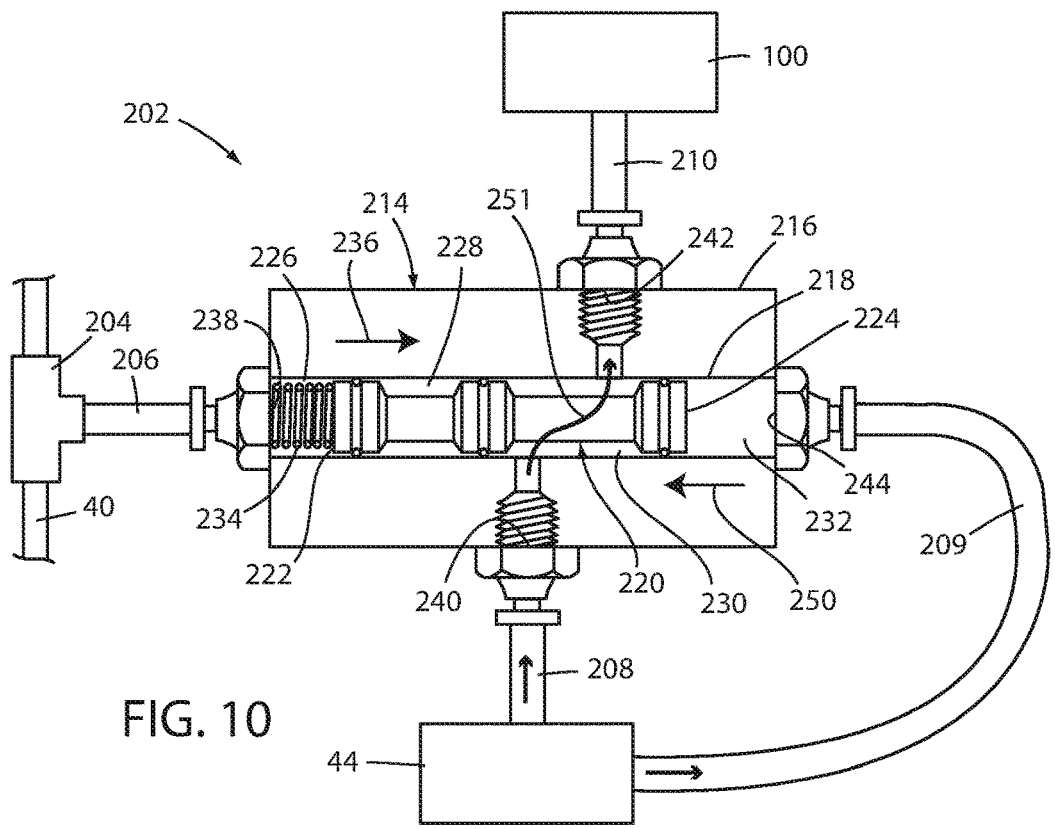
FIG. 10 is a schematic view of the component actuation arrangement in a second position.

In operation, the first chamber 226 is provided an air pressure as supplied to the air line 206 from the supply air line 40, which acts on the first end 222 of the valve member 220 along with the spring member 234 to force the valve member in the direction 236. In this condition, the air pressures within the second air chamber 228 and the third air chamber 230 are each in a state of equilibrium in that the respective air pressures do not move the valve member 220 within the valve bore 218. Air pressure is also provided to the fourth chamber 232 from the pneumatic source 44 and acts on the second end 224 of the valve member 220 but is insufficient to overcome the force exerted on the first end 222 of the valve member 220 by the air pressure within the first chamber 226 and the spring member 234 while the supply air line 40 is connected to the inlet arrangement 34 of the trailer 14 and is pressurized. In further operation, the fifth wheel coupling/decoupling arrangement may be automatically actuated by removing the air pressure from the supply line 40. Removing the air pressure from the supply line 40 may be accomplished by the operator via a selection switch located within the cab assembly of the truck 12, or by disconnecting the glad hand 68 of the supply line 40 from the inlet arrangement 34. Once the air pressure from the supply air line 40 is removed from the first chamber 226, the air pressure in the fourth chamber 232 supplied by the pneumatic source 44 forces the valve member in a direction 250 (FIG. 10) until the second port 240 and the third port 242 are both in pneumatic communication with the third chamber 230, thereby allowing air pressure from the pneumatic source 44 to travel along an air path 251 to the fifth wheel coupling/decoupling arrangement 100 to decouple or unlock the hitch plate assembly 22 from the kingpin 26.

In another alternative embodiment, the storage and controller arrangement 16 includes a safety automatic vehicle component actuation arrangement 300 (FIGS. 11 and 12) replacing the automatic component actuation arrangement 200. In the illustrated example, the component actuation arrangement 300 includes an activation valve arrangement 302 pneumatically coupled to the supply air line 40 via the T-fitting 204 (FIG. 12) and the valve supply air line 206, to the pneumatic source 44 via the air line 209 and a solenoid arrangement 308 and to a vehicle component such as the fifth wheel coupling/decoupling arrangement 100 via the air line 210. While the fifth wheel coupling/decoupling arrangement 100 is used as an example of the vehicle component, other vehicle arrangements may also be controlled via the actuation arrangement 300, such as automated landing gear arrangements, auxiliary lift axle arrangements, and the like. The safety automatic component actuation arrangement 300 is configured to automatically actuate a vehicle component such as a fifth wheel coupling/decoupling arrangement 100 when the glad hand 68 (FIG. 2) associated with the supply air line 40 is uncoupled from the electrical and pneumatic inlet arrangement 34, while simultaneously preventing accidental uncoupling of the fifth wheel assembly 22 from the kingpin 26. Alternatively, the fifth wheel coupling/decoupling arrangement 100 may be actuated by an operator via a selection switch located within the cab assembly of the truck 12. Further, alternatively, the vehicle component may comprise a landing gear arrangement and/or an auxiliary lift axle assembly including pressure sensors, ride height sensors, and the like, that communicate the necessity of support via the landing gear arrangement and/or auxiliary lift axle assembly.

In the illustrated example, the activation valve arrangement 302 includes a first valve assembly 310 and a second valve assembly 311 that include a valve housing 312 having a first valve bore 314 and a slidably receiving a first valve member 316, and a second valve bore 318 slidably receiving a second valve member 320. The first valve member 316 includes a first end 322 and a second end 324, and is configured to define a first chamber 326, a second chamber 328, a third chamber 330, a fourth chamber 332, and a fifth chamber 334 within the first valve bore 314. The first end 322 of the first valve member 316 has a greater surface area than the second end 334, such that an equal air pressure within the first chamber 326 and the fifth chamber 334 forces the first valve member toward the fifth chamber 334. The second valve member 320 has a first end 336 and a second end 338, and is configured to define a first chamber 340, a second chamber 342, a third chamber 344, a fourth chamber 346 and a fifth chamber 348 within the second valve bore 318. The first end 336 of the second valve member 320 has a greater surface area than the second end 338, such that an equal air pressure within the first chamber 340 and the fifth chamber 348 forces the second valve member 320 toward the fifth chamber 348.

Figure 11:
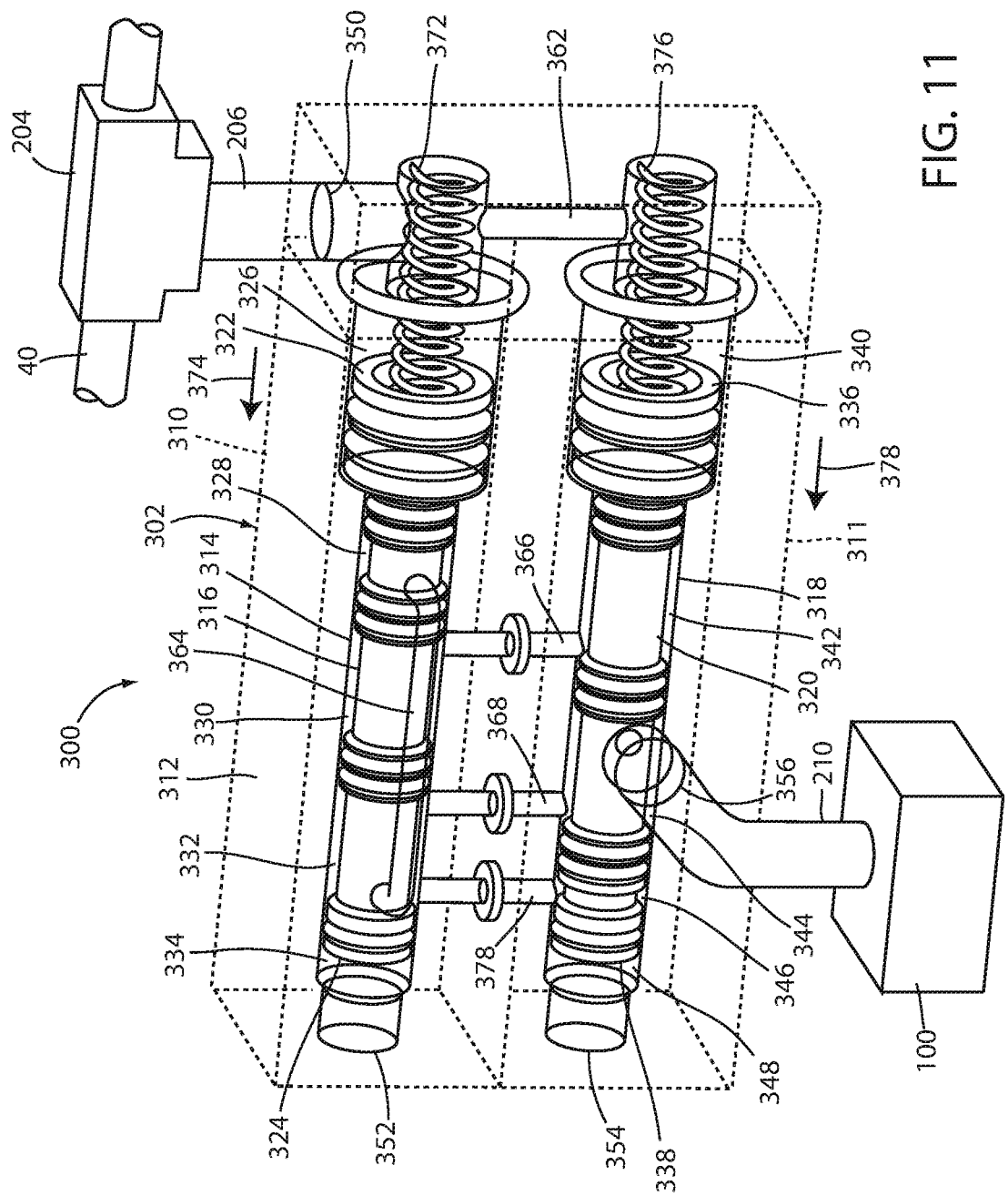
FIG. 11 is a schematic view of a safety automatic vehicle component actuation arrangement, wherein a first valve member and a second valve member are each in a first position.
Figure 12:
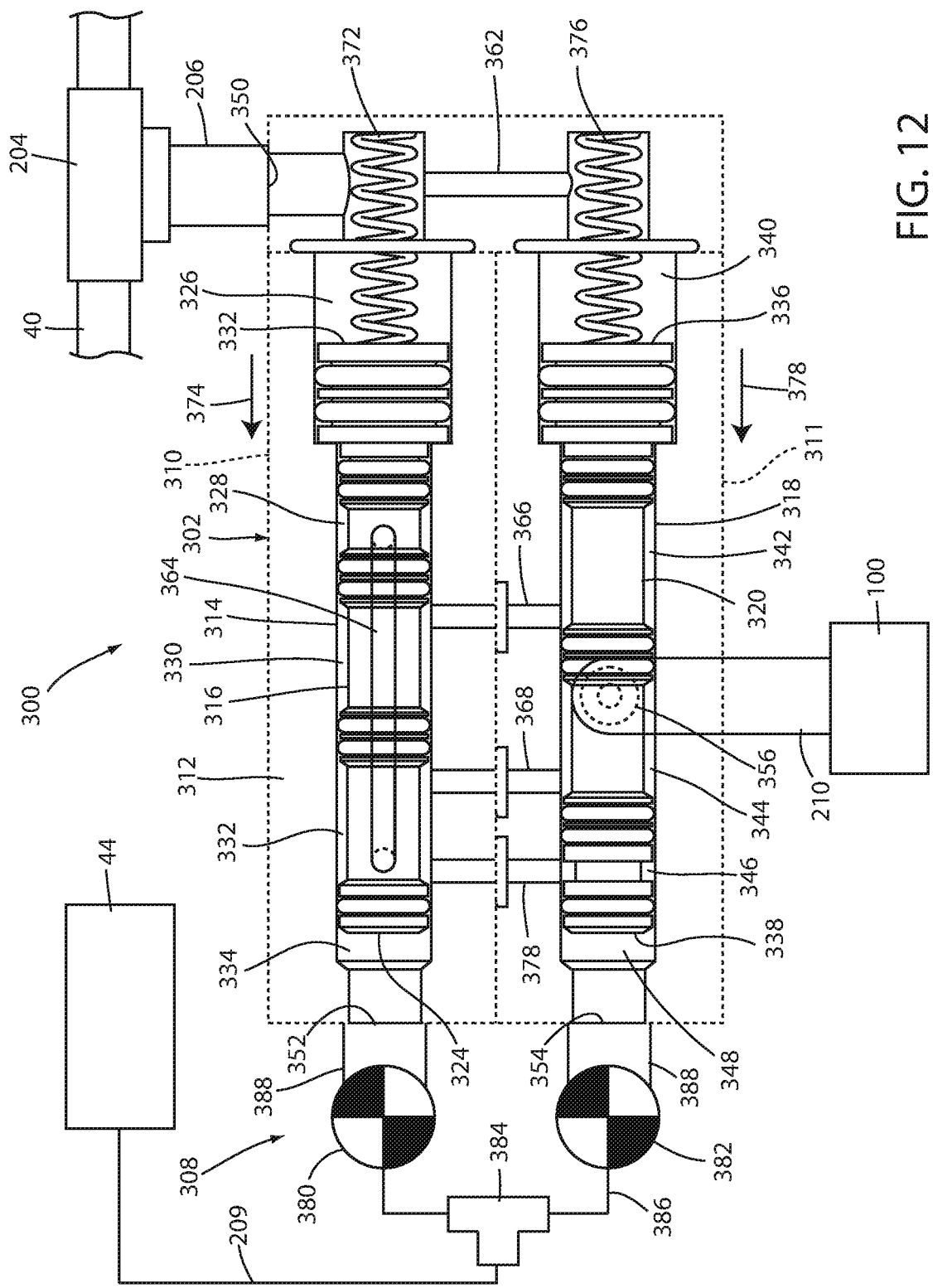
FIG. 12 is a schematic view of the actuation arrangement of FIG. 11, wherein the first and second valve members are in the respective first positions.
Figure 13:
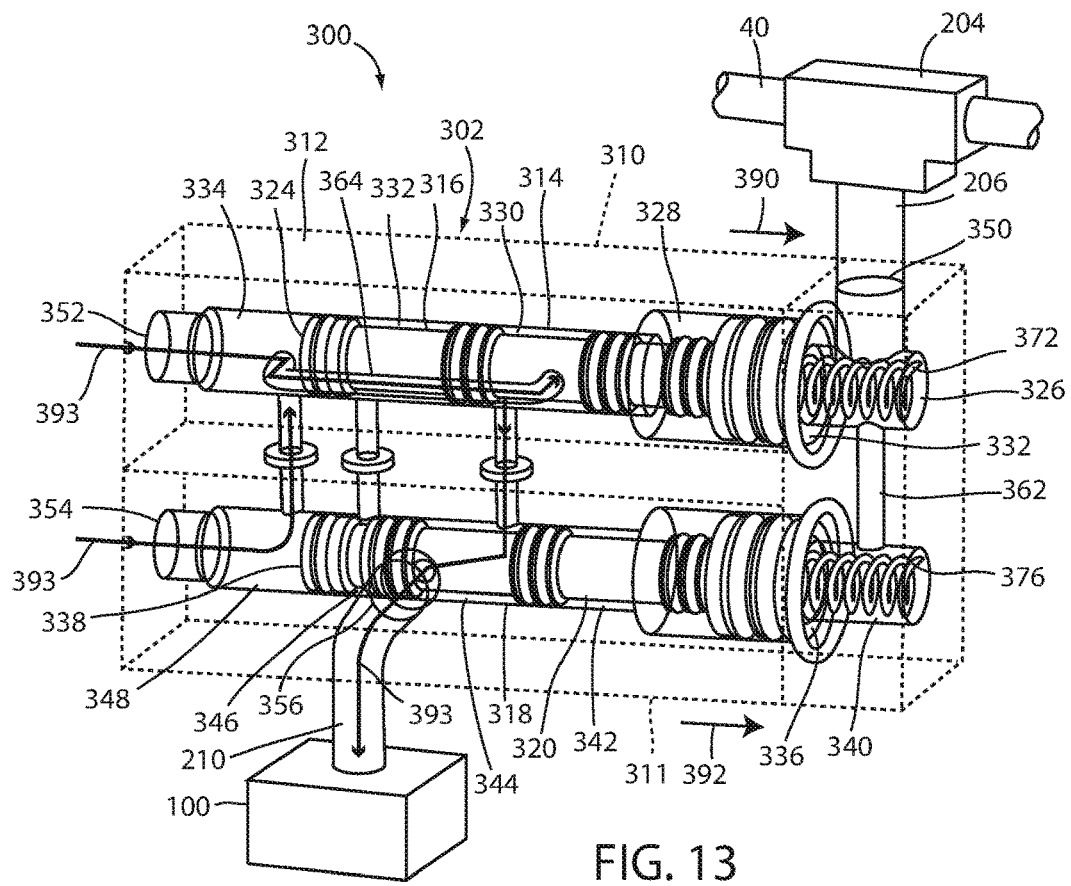
FIG. 13 is a schematic view of the actuation arrangement of FIG. 11, wherein the first and second valve members are each in a second position.
Figure 14:
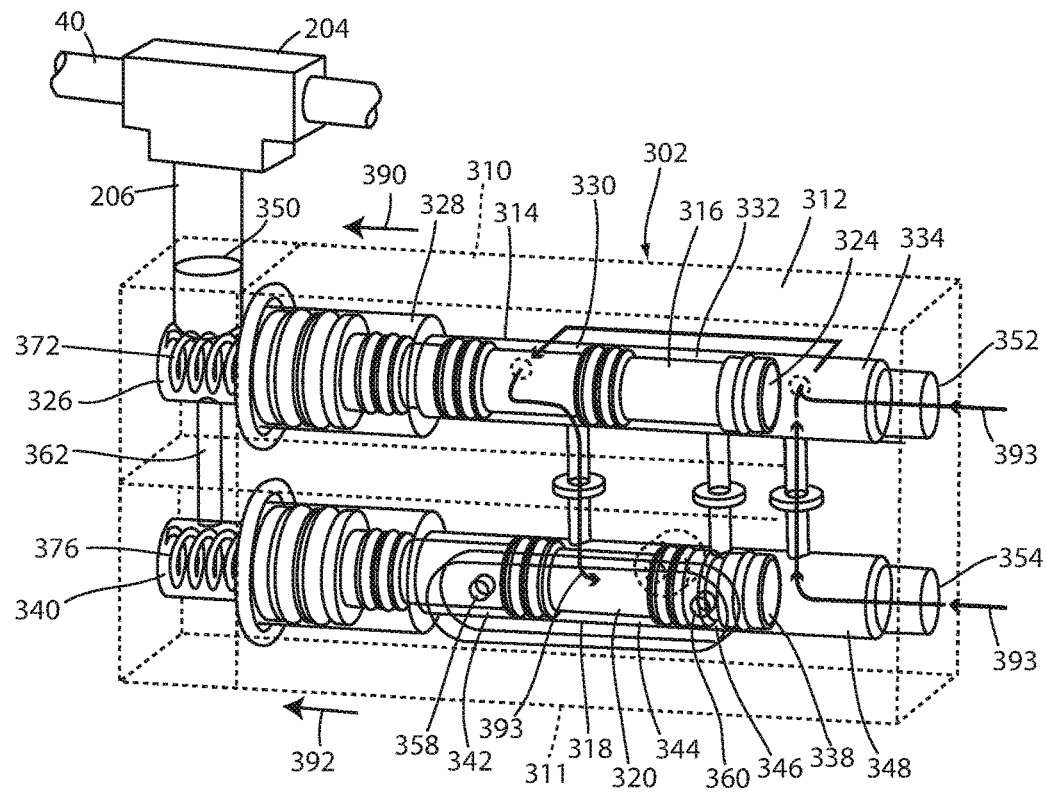
FIG. 14 is a schematic view of the actuation arrangement of FIG. 11, wherein the first and second valve members are each in the second position.

As illustrated in FIGS. 11 and 12, the valve housing 312 includes a first port 350 in pneumatic communication with the first chamber 326 of the first valve bore 314, the first chamber 340 of the second valve bore 318 and the supply air line 40 via the T-fitting 44 and the air line 206, a second port 352 in pneumatic communication with the fifth chamber 234 of the first valve bore 314 and the pneumatic source 44 via the air line 209 and the solenoid arrangement 308, a third port 354 in pneumatic communication with the fifth chamber 348 of the second valve bore 318 and the pneumatic source 44 via the air line 209 and the solenoid arrangement 308, a fourth port 356 in pneumatic communication with the fifth wheel coupling/decoupling arrangement 100 via the air line 210, a sixth port or exhaust port 358 (FIG. 14) in pneumatic communication with the second chamber 342 of the second valve bore 318, and a seventh or exhaust port 360 in pneumatic communication with the third chamber 344 of the second valve bore 318. In the illustrated configuration and position, the valve housing 312 further includes a first conduit 362 providing pneumatic communication between the first chamber 326 of the first valve bore 314 and the first chamber 340 of the second valve bore 318, a second conduit 364 providing pneumatic communication between the second chamber 328 and the fourth chamber 332 of the first valve bore 314, a third conduit 366 providing pneumatic communication between the third chamber 330 of the first valve bore 314 and the second chamber 342 of the second valve bore 318, a fourth conduit 368 providing pneumatic communication between the fourth chamber 332 of the first valve bore 314 and the third chamber 344 of the second valve bore 318, and a fifth conduit 370 providing fluid communication between the fourth chamber 332 of the first valve bore 314 and the fourth chamber 346 of the second valve bore 318.

A first spring member 372 abuts the valve housing 312 and the first end 322 of the first valve member 316, thereby biasing the first valve member 316 in a direction 374. A second spring member 376 abuts the valve housing 312 and the first end 336 of the second valve member 320, thereby biasing the second valve member 320 in a direction 378.

The solenoid arrangement 308 includes a first solenoid 380 and a second solenoid 382 that are in pneumatic communication with the pneumatic source 44 via the air line 209, a T-fitting 384 and a pair of air lines 386. The solenoids 380, 382 control air flow from the air lines 386 to corresponding air lines 388 in pneumatic communication with the second port 352 and the third port 354. It is noted that while a solenoid arrangement 308 is shown within the illustrated embodiment, other valve arrangements suitable for the application may also be utilized.

During vehicle operation, the solenoid 380 and the solenoid 382 are both closed such that air does not flow from the pneumatic source 44 to the fifth chamber 334 of the first valve bore 314 and the fifth chamber 348 of the second valve bore 318, such that the first valve member 316 and the second valve member remain in a first or closed position as shown in FIGS. 11 and 12. Once the vehicle is stopped and parked, the solenoids 380, 382 are opened either by an affirmative step taken by the operator, such as an input via an activation switch (not shown), or automatically when the operator performs a task such a setting the parking brake of the vehicle. Once the solenoids 380, 382 are opened, air pressure is supplied through the ports 352, 354 and into the fifth chamber 334 and the fifth chamber 348. It is noted that in this state, the pneumatic pressure acting on the first end 332 of the first valve member 316 and the first end 336 of the second valve member 320 plus the biasing force of each of the springs 372, 376 on the valve members 316, 320, respectively, is greater than the force exerted on the second ends 324, 338 of the valve members 316, 320 such that the valve members 316, 320 do not move within the respective valve bores 314, 318. The fifth wheel coupling/decoupling arrangement 100 is then automatically actuated by removing the air pressure from within the supply air line 40. Removing the air pressure from within the supply air line 40 may be accomplished by the operator via a selection switch located within the cab assembly of the truck 12, or automatically by disconnecting the glad hand 68 of the supply line 40 from the inlet arrangement 34. Once the air pressure is removed from within the first chamber 326 and the first chamber 340, the air pressure within the fifth chamber 334 and the fifth chamber 348 overcomes the biasing force being exerted on the first valve member 316 and the second valve member 320, respectively, such that the first valve member 316 moves in a direction 390 and the second valve member 320 moves in a direction 392. The first valve member moves in the direction 390 until the fifth chamber 334 of the first valve bore 314 pneumatically communicates with the third chamber 330 of the first valve bore 314 via the second conduit 364. The second valve member moves in the direction 392 until the fifth chamber 348 of the second valve bore 318 in in pneumatic communication with the fifth chamber 334 of the first valve bore 314 via the fifth conduit 370, the third chamber 330 of the first valve bore 314 is in pneumatic communication with the third chamber 344 of the second valve bore 318 via the third conduit 366, and the third chamber 344 of the second valve bore 318 is in fluid communication with the fourth port 356, thereby allowing air to travel from the pneumatic source 44 to the fifth wheel coupler/decoupler arrangement 100 along an air path 393 and actuate the fifth wheel coupler/decoupler arrangement 100. Alternatively, the fifth wheel coupler/decoupler arrangement 100 may be replaced or supplemented with either a landing gear arrangement and/or auxiliary lift axle arrangement, where the air traveling from the pneumatic source actuates the landing gear arrangement and/or auxiliary lift axle arrangement. Specifically, additional sensors configured to monitor systems configurations and states, such as trailer weight, air spring pressure, trailer ride height, fifth wheel coupling/uncoupling status, and the like, communicate with the controller arrangement 16, and automatically deploy and/or retract the landing gear assembly and/or auxiliary lift axle assembly depending on the configuration and state of the system. For example, an auxiliary lift axle assembly may be automatically retracted when the glad hand 68 associated with the air line 40 is uncoupled from the electronic and pneumatic inlet arrangement 34, or when the fifth wheel assembly 22 is moved to an uncoupled position, or when the operator actuates the auxiliary lift axle assembly via a selector switch located at the controller arrangement 16 or within the cab of the truck 12. In the latter example, the controller arrangement 16 may be configured to allow retraction or deployment of the auxiliary lift axle assembly only subsequent to the glad hand 68 is uncoupled from the electronic and pneumatic inlet arrangement 34.

Figure 15:
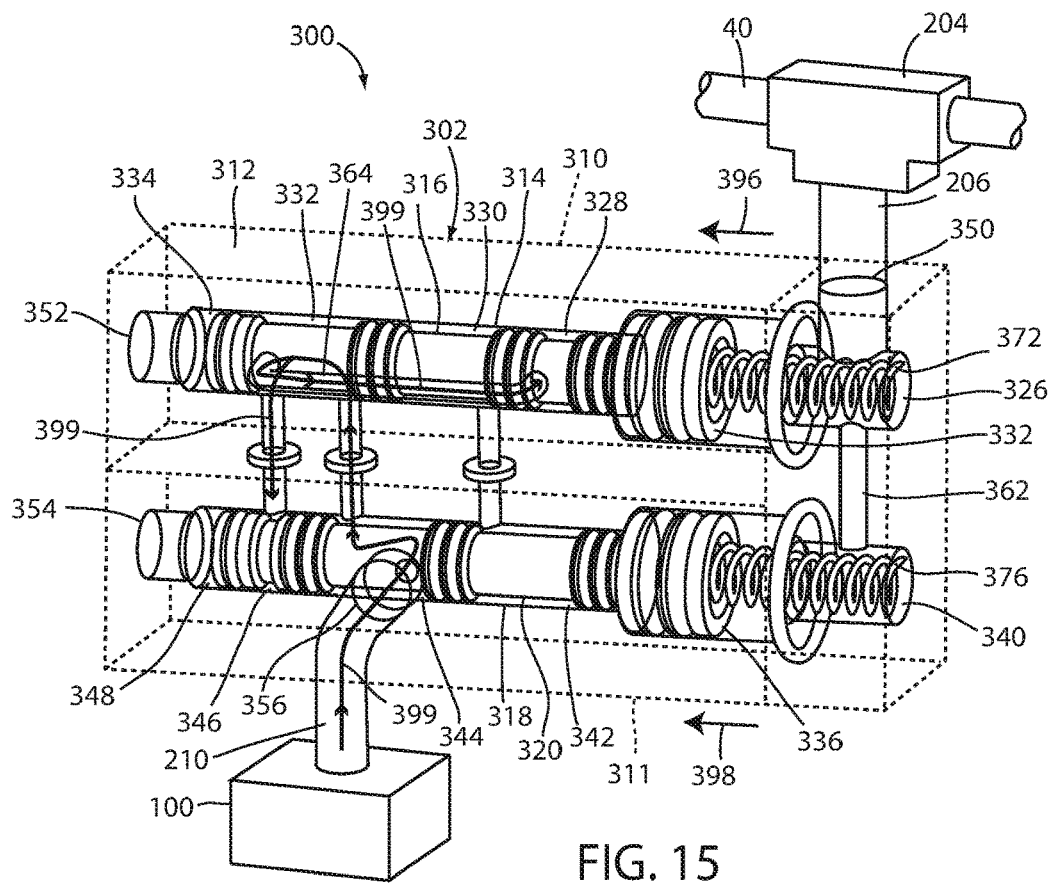
FIG. 15 is a schematic view of the actuation arrangement of FIG. 11, wherein the first and second valve members are each in the first position.
Figure 16:
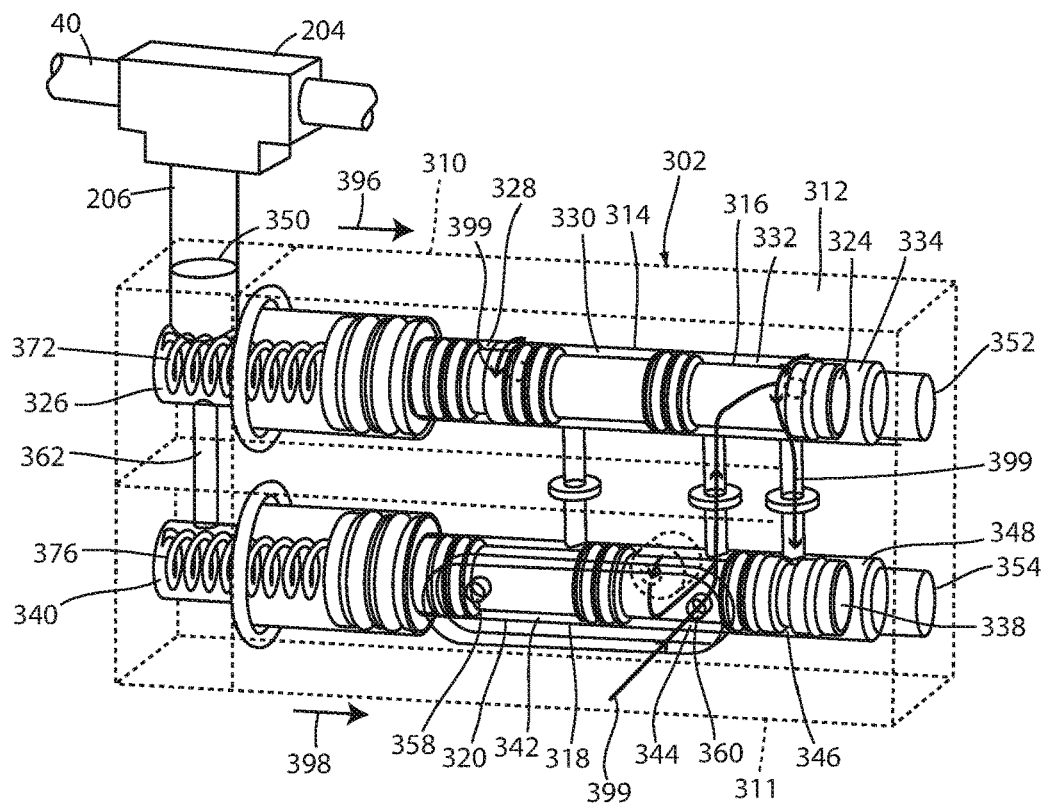
FIG. 16 is a schematic view of the actuation arrangement of FIG. 11, wherein the first and second valve members are each in the first position.
Figure 17:
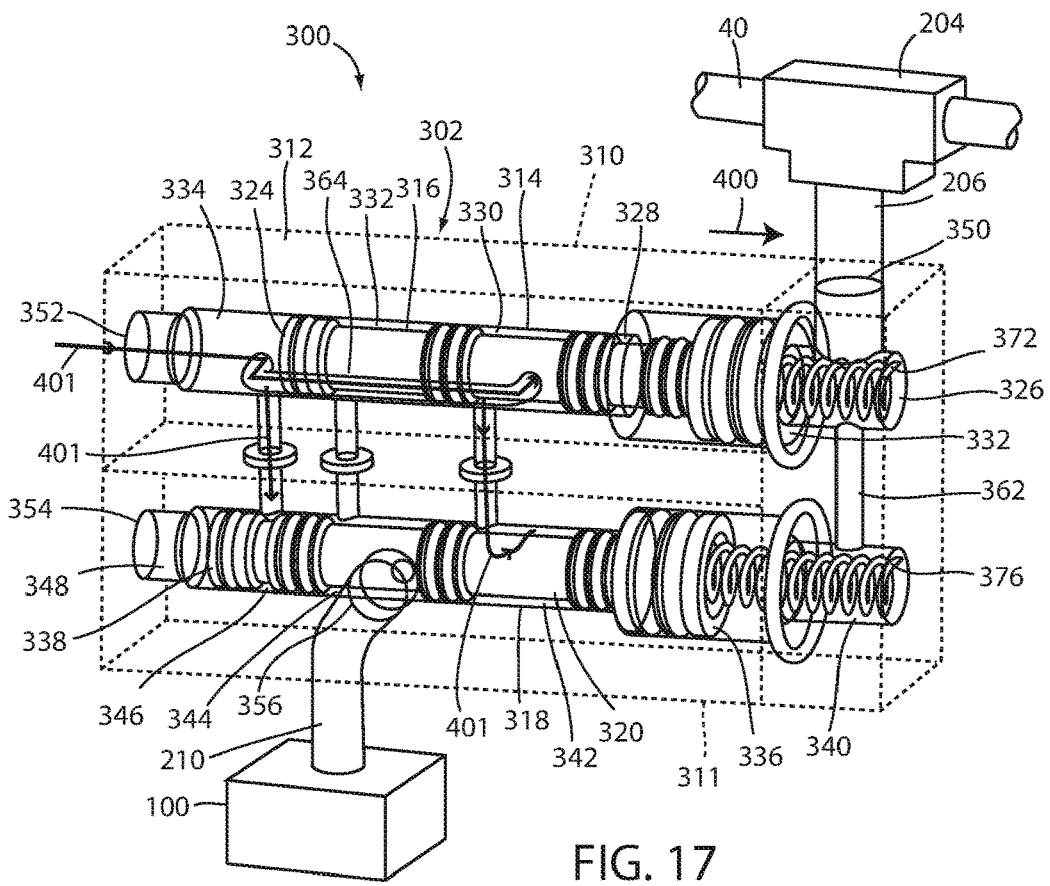
FIG. 17 is a schematic view of the actuation arrangement of FIG. 11, wherein the first valve member is in the second position and the second valve member is in the first position.
Figure 18:
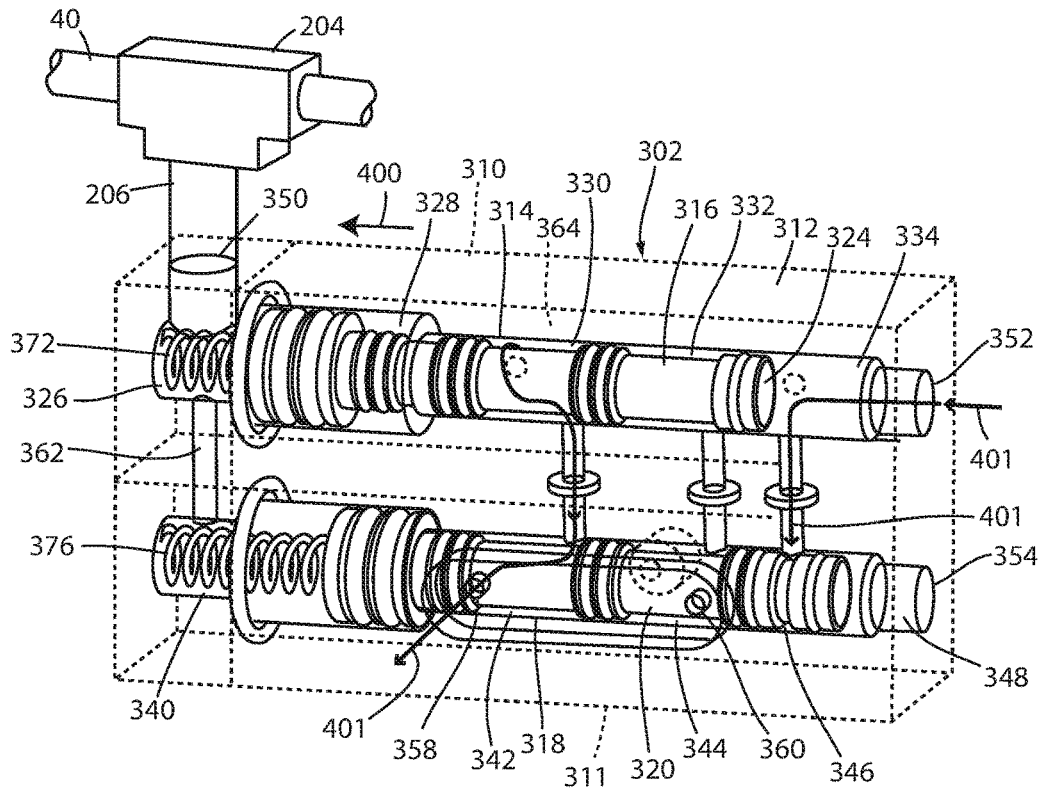
FIG. 18 is a schematic view of the actuation arrangement of FIG. 11, wherein the first valve member is in the second position and the second valve member is in the first position.

Subsequent to the fifth wheel uncoupling process, the solenoids 380, 382 dump the air pressure within the fifth chamber 334 (FIGS. 15 and 16) of the first valve bore 314 and the fifth chamber 348 of the second valve bore 318, thereby allowing the biasing force of the spring member 372, 376 to force the first valve member 316 and the second valve member 320 in the directions 396, 398, respectively. The first valve member 316 moves in the direction 396 until the second chamber 328 of the first valve bore 314 is in pneumatic communication with the fourth chamber 328 of the first valve bore 314 via the second conduit 364, the fourth chamber 346 of the second valve bore 318 is in fluid communication with the fourth chamber 328 of the first valve bore 314 via the fifth conduit 370, the fourth chamber 328 of the first valve bore 314 is in fluid communication with the third chamber 344 of the second valve bore 318, and the third chamber 344 of the second valve bore 318 is in pneumatic communication with the fifth wheel coupler/decoupler arrangement 100 and the exhaust port 360, thereby allowing a spring force within the associated fifth wheel hitch plate assembly 22 to return the fifth wheel coupler/decoupler arrangement 100 to an unactuated position and the air pressure within the fifth wheel coupler/decoupler arrangement 100 to travel along a path 399 and to pass through the fourth port 356 and the exhaust port 360.

The safety automatic component actuation arrangement 300 is further configured to prevent unintentional or accidental actuation of the coupler/decoupler arrangement 100 by alerting the operator of potential damage of one of the solenoids 380, 382. Failure of either of the solenoids 380, 382 may be detected by the operator when pressure is removed from within the supply air line 40 either via a switch input or when the glad hand 64 is disconnected from the input arrangement 34 as previously described. By way of example, when the operator disconnects the glad hand 64 from the input arrangement 34, a failure of the first solenoid 380 allows air to travel past the first solenoid and into the fifth chamber 334 via the second port 352, thereby forcing the first valve member 316 in a direction 400. The first valve member 316 travels in the direction 400 until the fifth chamber 334 of the first valve bore 314 is in pneumatic communication with the fourth chamber 346 of the second valve bore 318 via the fifth conduit 370 and the third chamber 330 of the first valve bore 314 via the second conduit 364, the third chamber 330 of the first valve bore 314 is in fluid communication with the second chamber 342 of the second valve bore 318 via the third conduit 366, and the second chamber 342 of the second valve bore 318 is in fluid communication with exhaust port 358, such that air received by the second port 352 travels along an air path 401 and exits the exhaust port 358. Air exiting the exhaust port 358 provides an audible "hissing" noise, thereby alerting the operator to potential damage or faulty operation of one of the solenoids 380, 382.

Figure 19:
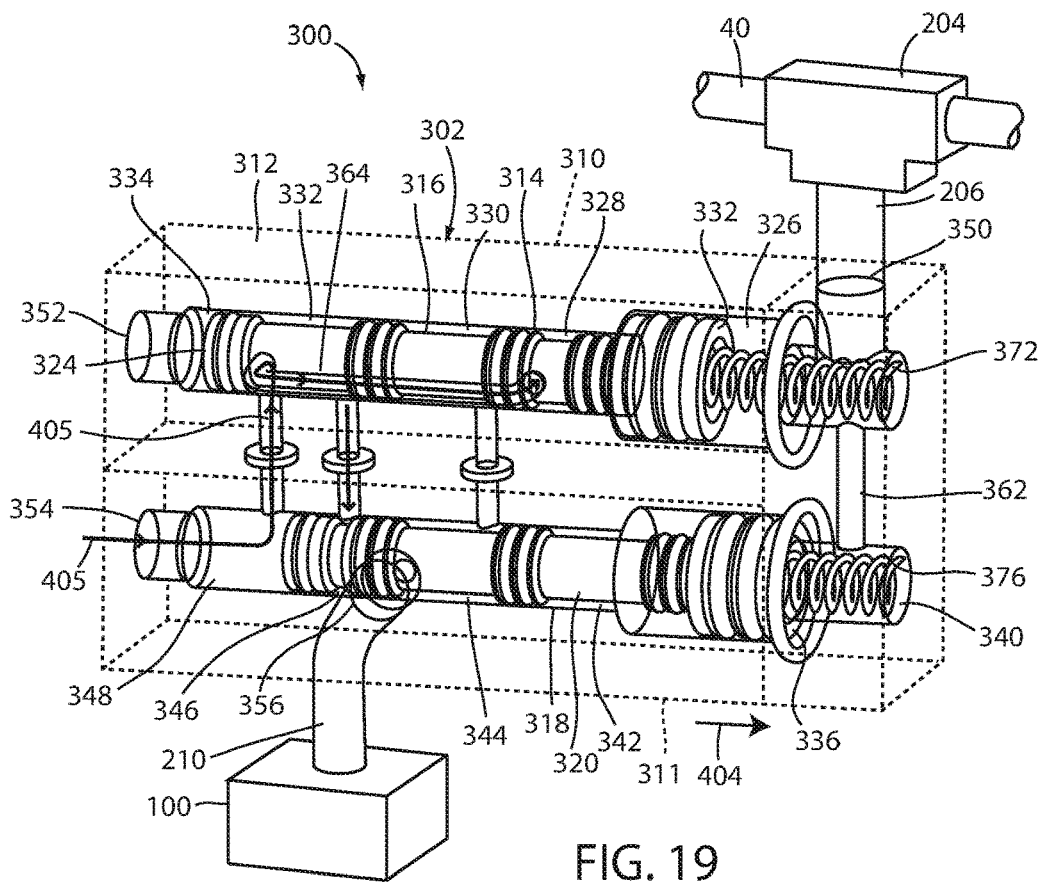
FIG. 19 is a schematic view of the actuation arrangement of FIG. 11, wherein the first valve member is in the first position and the second valve member is in the second position.
Figure 20:
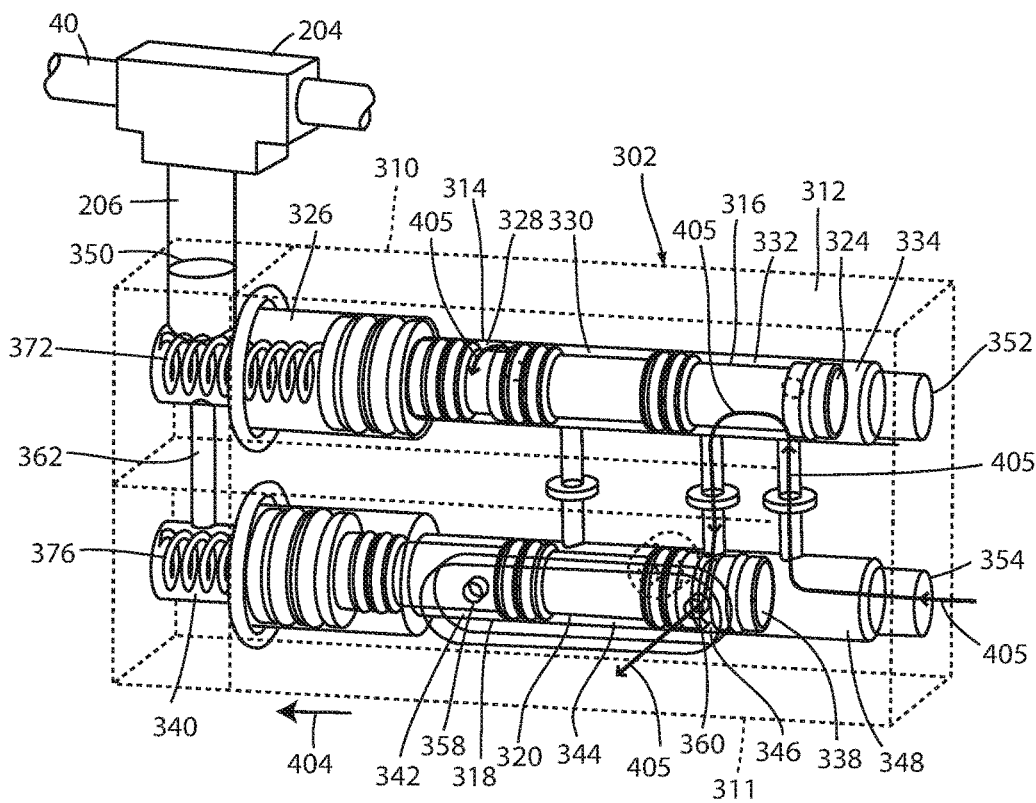
FIG. 20 is a schematic view of the actuation arrangement of FIG. 11, wherein the first valve member is in the first position and the second valve member is in the second position.

A similar audible noise alert is also provided if the second solenoid 382 fails, thereby allowing air to pass by the second solenoid 382 and to the fifth chamber 348 of the second valve bore 318. Specifically, when the operator disconnects the glad hand 64 from the input arrangement 34, a failure of the second solenoid 382 allows air pressure to travel past the second solenoid 382 and into the fifth chamber 348 via the third port 354, thereby forcing the second valve member 320 in a direction 404 (FIGS. 19 and 20). The second valve member 382 travels in the direction 404 until the fifth chamber 348 of the second valve bore 318 is in fluid communication with the fourth chamber 332 of the first valve bore 314 via the fifth conduit 370, the fourth chamber 332 of the first valve bore 314 is in fluid communication with the second chamber 328 of the first valve bore 314 via the second conduit 364 and the fourth chamber 346 of the second valve bore 318 via the fourth conduit 368, and the fourth chamber 346 of the second valve bore 318 is in fluid communication with the exhaust port 360, such that air received by the third port 354 travels along an air path 405 and exits the exhaust port 360. Air exiting the exhaust port 360 provides an audible "hissing" noise, thereby alerting the operator to potential damage or faulty operation of one of the solenoids 380, 382.

In another alternative embodiment, the unit 16 may also be operably coupled with the fifth wheel sensor arrangement or assembly 94 (FIG. 4) so as to provide a separate audible or visual warning to the operator warning of an unsafe coupling state. Specifically, a T-fitting 420 (FIG. 2) may be located along the length of the supply air line 40 to supply air to a pressure switch 412, which is in turn in electronic communication with the fifth wheel sensor arrangement or assembly 94 as described in Schutt et al., U.S. Pat. No. 7,548,155. As previously described, the fifth wheel sensor arrangement 94 is in communication with the logic circuit 82, which is in turn capable of providing an electronic output 96. In the present example, the electronic output may be used to provide either an audible or visual warning to the driver. Specifically, the logic circuit 82 receives a signal from the pressure switch 412 indicating that the pneumatic pressure has been supplied to the supply air line 40, and then determines whether a proper coupling arrangement has been met via the signal received from the fifth wheel sensor arrangement 94. If a proper coupling arrangement has not been met, the logic circuit 82 provides the electronic output 94 that is then utilized to power an audible and/or visual warning to the driver indicating an improper or hazardous coupling state.

The various embodiments of the storage and control arrangements assist in ensuring that electrical and pneumatic lines connecting a tractor truck to a trailer are not sheared or accidentally damaged while uncoupling the trailer from the truck. The storage and control arrangement also provides feedback to an operator regarding the status of the coupling of the lines to the overall unit, as well as the status of the relative arrangement of associated kingpin and fifth wheel hitch assemblies, thereby increasing operational safety and decreasing the likelihood of injury to the operator and damage to the truck and trailer. The system disclosed further provides for the automatic coupling/decoupling of an associated fifth wheel hitch arrangement upon disconnect of pneumatic lines from the trailer. The system disclosed herein further increases the operational safety by providing feedback to the operator alerting the operator to potential system damage. The configuration of the storage and control arrangement allows use on new vehicle builds, as well as easy and inexpensive adaptation in retrofitting nearly any truck platform. The storage and control arrangement is efficient in use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle component actuation arrangement, comprising:
   a vehicle component movable between a first configuration and a second configuration;
   an actuator configured to move the vehicle component between the first configuration and the second configuration; and
   a pneumatic valve arrangement pneumatically coupled to a vehicle air supply line, a vehicle pneumatic source and the actuator, where the valve arrangement is configured to move the vehicle component between the first and second configuration via the actuator when an air pressure is removed from within the vehicle air supply line;
   wherein the vehicle component is a fifth wheel assembly.

2. The vehicle component actuation arrangement of claim 1, wherein the actuator is pneumatically operated.

3. The vehicle component actuation arrangement of claim 1, wherein the pneumatic valve arrangement includes a valve member movable between a closed position where the vehicle component remains in the first configuration, and an open position where the actuator moves the vehicle component from the first configuration to the second configuration.

4. The vehicle component actuation arrangement of claim 1, wherein the pneumatic valve arrangement includes a biasing member that biases a valve member from the open position toward the closed position.

5. The vehicle component actuation arrangement of claim 1, wherein a valve member includes a first end in pneumatic communication with the vehicle air supply line and second end in pneumatic communication with the pneumatic source, and wherein the first end has a surface area that is greater than a surface area of the second end.

6. A vehicle component actuation arrangement, comprising:
- a vehicle component movable between a first configuration and a second configuration;
- an actuator configured to move the vehicle component between the first configuration and the second configuration; and
- a pneumatic valve arrangement pneumatically coupled to a vehicle air supply line, a vehicle pneumatic source and the actuator, where the valve arrangement is configured to move the vehicle component between the first and second configuration via the actuator when an air pressure is removed from within the vehicle air supply line;
- wherein the pneumatic valve arrangement includes a first chamber in pneumatic communication with the vehicle air supply line, a second chamber in pneumatic communication with the vehicle pneumatic source, a third chamber in pneumatic communication with the actuator, and a fourth chamber in pneumatic communication with the actuator.

7. A vehicle component actuation arrangement, comprising:
- a vehicle component movable between a first configuration and a second configuration;
- an actuator configured to move the vehicle component between the first configuration and the second configuration; and
- a pneumatic valve arrangement pneumatically coupled to a vehicle air supply line, a vehicle pneumatic source and the actuator, where the valve arrangement is configured to move the vehicle component between the first and second configuration via the actuator when an air pressure is removed from within the vehicle air supply line;
- wherein the vehicle air supply line is connected to a glad hand, wherein disconnecting the glad hand from a towed vehicle removes the air pressure from within the vehicle air supply line.

8. A vehicle component actuation arrangement, comprising:
- a vehicle component movable between a first configuration and a second configuration;
- an actuator configured to move the vehicle component between the first configuration and the second configuration; and
- a pneumatic valve arrangement that includes a valve member that divides a valve bore into a first chamber in pneumatic communication with a vehicle air supply line, a second chamber, a third chamber and fourth chamber in pneumatic communication with a pneumatic source, wherein the valve member is movable between a first position where the second chamber is in pneumatic communication with the pneumatic source and the first chamber is in pneumatic communication with the actuator, and a second position where the third chamber is in pneumatic communication with the pneumatic source and the actuator, and wherein the valve member is configured to move from the first position to the second position when an air pressure is removed from within the vehicle air supply line, thereby moving the vehicle component from the first position to the second position via the actuator.

9. The vehicle component actuation arrangement of claim 8, wherein the vehicle component is a fifth wheel hitch assembly.

10. The vehicle component actuation arrangement of claim 8, wherein the actuator is pneumatically operated.

11. The vehicle component actuation arrangement of claim 8, wherein the pneumatic valve arrangement includes a biasing member that biases the valve member from the open position toward the closed position.

12. The vehicle component actuation arrangement of claim 8, wherein the vehicle air supply line is connected to a glad hand, wherein disconnecting the glad hand from a towed vehicle removes the air pressure from within the vehicle air supply line.

13. The vehicle component actuation arrangement of claim 12, wherein the valve member includes a first end in pneumatic communication with the vehicle air supply line and second end in pneumatic communication with the pneumatic source, and wherein the first end has a surface area that is greater than a surface area of the second end.

* * * * *

UNITED STATES PATENT AND TRADEMARK OFFICE
CERTIFICATE OF CORRECTION

PATENT NO. : 10,850,782 B2  
APPLICATION NO. : 15/897818  
DATED : December 1, 2020  
INVENTOR(S) : Keatley et al.

Page 1 of 2

It is certified that error appears in the above-identified patent and that said Letters Patent is hereby corrected as shown below:

In the Specification

Column 1, Line 25:  
After "movable" insert -- between --

Column 1, Line 36:  
After "movable" insert -- between --

Column 1, Line 47:  
"communicate" should be – communication –

Column 1, Line 56:  
After "movable" insert -- between --

Column 2, Line 6:  
After "yet" insert -- another --

Column 2, Line 7:  
After "movable" insert -- between --

Column 2, Lines 16, 22:  
After "with" insert -- the --

Column 2, Line 62:  
"adaption" should be – adaptation –

Column 6, Line 24:  
After "one" insert -- of --

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,850,782 B2

Column 6, Line 30 (1st occurrence):
Delete "be"

Column 8, Line 3:
After "appearing" insert -- in --

Column 8, Line 30:
"26" should be – 22 –

Column 8, Line 39:
Delete "(FIG. 6)"

Column 8, Line 56:
"operation" should be – operator –

Column 10, Line 27:
Delete "a" (2nd occurrence)

Column 10, Line 35:
"334" should be – 324 –

Column 10, Line 52:
"234" should be – 334 –

Column 11, Line 40:
"a" (2nd occurrence) should be – as –

Column 12, Line 3:
"in" should be – is –

Column 12, Line 20:
"systems" should be – system –

Column 12, Line 36:
"is" should be – being –